United States Patent
He et al.

(10) Patent No.: US 10,142,859 B2
(45) Date of Patent: Nov. 27, 2018

(54) ROUTING METHOD AND ROUTING APPARATUS

(71) Applicant: HUAWEI TECHNOLOGIES CO., LTD., Shenzhen (CN)

(72) Inventors: Ning He, Shenzhen (CN); Chunshan Xiong, Beijing (CN); Jianning Liu, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 52 days.

(21) Appl. No.: 15/201,877

(22) Filed: Jul. 5, 2016

(65) Prior Publication Data

US 2016/0316383 A1    Oct. 27, 2016

Related U.S. Application Data

(63) Continuation of application No. PCT/CN2014/070165, filed on Jan. 6, 2014.

(51) Int. Cl.
*H04W 4/00* (2018.01)
*H04W 24/02* (2009.01)
(Continued)

(52) U.S. Cl.
CPC ........... *H04W 24/02* (2013.01); *H04L 47/825* (2013.01); *H04L 61/1511* (2013.01);
(Continued)

(58) Field of Classification Search
CPC ... H04W 24/02; H04W 80/04; H04W 88/182; H04W 40/24; H04L 69/22; H04L 61/6086; H04L 61/1511; H04L 47/825
See application file for complete search history.

(56) References Cited

U.S. PATENT DOCUMENTS

| | | | |
|---|---|---|---|
| 2004/0202183 A1 | 10/2004 | Thubert et al. | |
| 2006/0274672 A1* | 12/2006 | Venkitaraman | ..... H04L 43/0811 370/254 |

(Continued)

FOREIGN PATENT DOCUMENTS

| | | |
|---|---|---|
| CN | 1745558 A | 3/2006 |
| CN | 101119297 A | 2/2008 |

(Continued)

OTHER PUBLICATIONS

Xue et al. ("Routing optimization in DMM", draft-xue-dmm-routing-optimization-02.txt, DMM, Internet-Draft, Jun. 20, 2013).*

(Continued)

*Primary Examiner* — Clemence S Han
(74) *Attorney, Agent, or Firm* — Staas & Halsey LLP

(57) ABSTRACT

Embodiments of the present invention provide a routing method and a routing apparatus. The routing method includes: receiving a first data packet sent by a first mobile node to a first communication peer end, where the first mobility router is a mobility router in a visited network of the first mobile node, and the first data packet includes an address of the first communication peer end; acquiring an address of a proxy routing entity based on the address of the first communication peer end, where the proxy routing entity is located in a communication path between the first mobility router and the first communication peer end; establishing a first tunnel to the proxy routing entity based on the address of the proxy routing entity; and transmitting, by using the first tunnel, a data packet sent by the first communication peer end to the first mobile node.

18 Claims, 11 Drawing Sheets

(51) Int. Cl.
*H04L 12/911* (2013.01)
*H04L 29/12* (2006.01)
*H04L 29/06* (2006.01)
*H04W 80/04* (2009.01)
*H04W 40/24* (2009.01)
*H04W 88/18* (2009.01)

(52) U.S. Cl.
CPC .......... *H04L 61/6086* (2013.01); *H04L 69/22* (2013.01); *H04W 80/04* (2013.01); *H04W 40/24* (2013.01); *H04W 88/182* (2013.01)

(56) References Cited

U.S. PATENT DOCUMENTS

| | | | |
|---|---|---|---|
| 2008/0137591 | A1 | 6/2008 | Hirano et al. |
| 2008/0181113 | A1 | 7/2008 | Narayanan et al. |
| 2010/0046419 | A1 | 2/2010 | Hirano et al. |
| 2010/0091707 | A1* | 4/2010 | Janneteau ............ H04W 8/082 370/328 |
| 2010/0157942 | A1* | 6/2010 | An .................... H04W 36/0077 370/331 |
| 2010/0220738 | A1 | 9/2010 | Sarikaya |
| 2013/0176943 | A1 | 7/2013 | Chan |

FOREIGN PATENT DOCUMENTS

| | | |
|---|---|---|
| CN | 101123575 A | 2/2008 |
| CN | 101212773 A | 7/2008 |
| CN | 101494849 A | 7/2009 |
| CN | 101742703 A | 6/2010 |
| EP | 1 593 022 B1 | 4/2013 |
| EP | 3 073 713 A1 | 9/2016 |
| JP | 2006-114946 | 4/2006 |
| JP | 2010-510729 | 4/2010 |
| JP | 2011-97600 | 5/2011 |
| JP | 2012-519433 | 8/2012 |
| WO | WO 2004/072807 A2 | 8/2004 |

OTHER PUBLICATIONS

Japanese Notice of Rejection dated Aug. 22, 2017 in corresponding Japanese Patent Application No. 2016-562050.
K. Xue et al.: "Routing Optimization in DMM," draft-xue-dmm-routing-optimization-02.txt, DMM, Internet draft, Jun. 20, 2013, URL: http://tools.ietf.org/pdf/draft-xue-dmm-routing-optimization-02.pdf.
International Search Report dated Oct. 10, 2014 in corresponding International Patent Application No. PCT/CN2014/070165.
Extended European Search Report dated Dec. 22, 2016 in corresponding European Patent Application No. 14876201.6.
Chan, "A Unified Mobility Management Protocol Framework and DMM Gap Analysis draft-chan-framework-gap-analysis-03", Network Working Group, Oct. 16, 2012, pp. 1-29.
Seite et al., "Distributed Mobility Anchoring draft-seite-dmm-dma-06.txt", Network Working Group, Jan. 9, 2013, pp. 1-15.
International Search Report dated Oct. 10, 2014 in corresponding International Application No. PCT/CN2014/070165.
Chinese Office Action dated Aug. 13, 2018 in corresponding Chinese Patent Application No. 201480012938.3, 8 pgs.

* cited by examiner

ROUTING METHOD AND ROUTING APPARATUS

CROSS-REFERENCE TO RELATED APPLICATIONS

This application is a continuation of International Application No. PCT/CN2014/070165, filed on Jan. 6, 2014, which is hereby incorporated by reference in its entirety.

TECHNICAL FIELD

Embodiments of the present invention relate to the communications field, and in particular, to a routing method and a routing apparatus.

BACKGROUND

A mobile Internet Protocol (IP) technology is designed to meet a requirement for maintaining connectivity of a mobile node when the mobile node is in motion, including a mobile IPv4 technology and a mobile IPv6 technology. A distributed mobility management Distributed Mobility Management (DMM) technology is already proposed, and the DDM technology relates to two logical entities: a Mobility Router (MR) and a Location Management (LM). In the DDM technology, a mobility router accessed by a Mobile Node (MN) may be used as an anchor of mobility management. A main function of the MR is to intercept a data packet of the MN and forward the data packet of the MN to a correct destination. A main function of the LM is to manage and track a location of the MN, so that the MR can route the data packet of the MN to a correct address.

For example, when the MN is attached to a home network, a Home Mobility Router (H-MR), that is, an anchor in the home network of the MN, allocates an IP address to the MN, and the MN uses the IP address to initiate a session. When the MN moves to a Current Mobility Router (C-MR) network, the C-MR allocates a new LP address to the MN, and the MN uses the new IP address to initiate a new session in the network. In addition, the MN needs to reserve the IP address allocated by the H-MR, to maintain the session initiated in the home network.

In the DMM technology, to maintain continuity of an original session, when the MN moves to a visited network, the session needs to be forwarded through the home network. For example, a tunnel may be established between the H-MR and the C-MR, to forward data.

Because all data of the MN needs to be forwarded via the home network, a route redundancy problem is caused when the MN is away from the home network.

SUMMARY

Embodiments of the present invention provide a routing method and a routing apparatus, which can resolve a route redundancy problem.

According to a first aspect, a routing method is provided, including: receiving, by a first mobility router, a first data packet sent by a first mobile node to a first communication peer end, where the first mobility router is a mobility router in a visited network of the first mobile node, and the first data packet includes an address of the first communication peer end; acquiring, by the first mobility router, an address of a proxy routing entity based on the address of the first communication peer end, where the proxy routing entity is located in a communication path between the first mobility router and the first communication peer end; establishing, by the first mobility router, a first tunnel to the proxy routing entity based on the address of the proxy routing entity; and transmitting, by the first mobility router by using the first tunnel, a data packet sent by the first communication peer end to the first mobile node.

With reference to the first aspect, in a first possible implementation manner, before the establishing, by the first mobility router, a first tunnel to the proxy routing entity based on the address of the proxy routing entity, the routing method further includes: establishing, by the first mobility router, a second tunnel to a second mobility router, where the second mobility router is a mobility router in a home network of the first mobile node; and before completing establishment of the first tunnel, transmitting, by the first mobility router, the first data packet between the first mobile node and the first communication peer end by using the second tunnel; and the transmitting, by the first mobility router by using the first tunnel, a data packet sent by the first communication peer end to the first mobile node includes: transmitting, by the first mobility router by using the first tunnel, a subsequent data packet that follows the first data packet and is sent by the first communication peer end to the first mobile node.

With reference to the first possible implementation manner, in a second possible implementation manner, the routing method further includes: tearing down, by the first mobility router, the first tunnel and the second tunnel when determining that the first mobile node communicates with the first communication peer end by using a third tunnel between a third mobility router and the proxy routing entity and a fourth tunnel between the third mobility router and the second mobility router.

With reference to the first aspect, in a third possible implementation manner, the routing method further includes: caching, by the first mobility router, the first data packet before completing establishment of the first tunnel; and/or forwarding, by the first mobility router by using the first tunnel, the cached first data packet to the first communication peer end after completing establishment of the first tunnel.

With reference to the first aspect or any one of the first to the third possible implementation manners, in a fourth possible implementation manner, the acquiring, by the first mobility router, an address of a proxy routing entity based on the address of the first communication peer end includes: acquiring, by the first mobility router, the address of the proxy routing entity from a server based on the address of the first communication peer end, where a binding relationship between the address of the proxy routing entity and the address of the first communication peer end is set on the server.

With reference to the fourth possible implementation manner of the first aspect, in a fifth possible implementation manner, the server is a location management entity or a centralized server, and the acquiring, by the first mobility router, the address of the proxy routing entity from a server based on the address of the first communication peer end includes: sending, by the first mobility router, a request message that includes the address of the first communication peer end to the location management entity or the centralized server; and receiving, by the first mobility router, a response message that includes the address of the proxy routing entity and is returned by the location management entity or the centralized server.

With reference to the fourth possible implementation manner of the first aspect, in a sixth possible implementation manner, the server is a domain name server, and the acquiring, by the first mobility router, an address of a proxy routing entity based on the address of the first communication peer end includes: sending, by the first mobility router, a request message that includes the address of the first communication peer end to the domain name server, to acquire the address of the proxy routing entity; receiving, by the first mobility router, a response message that includes a domain name corresponding to the address of the first communication peer end and is returned by the domain name server; sending, by the first mobility router, a request message that includes the domain name corresponding to the address of the first communication peer end to the domain name server; and receiving, by the first mobility router, a response message that includes the address of the proxy routing entity and is returned by the domain name server.

With reference to the first possible implementation manner of the first aspect, in a seventh possible implementation manner, the acquiring, by the first mobility router, an address of a proxy routing entity based on the address of the first communication peer end includes: receiving, by the first mobility router, a route optimization command sent by the second mobility router, where the route optimization command includes the address of the proxy routing entity and is used to instruct the first mobility router to establish the first tunnel to the proxy routing entity; and acquiring, by the first mobility router, the address of the proxy routing entity from the route optimization command.

With reference to the first aspect or any one of the first to the seventh possible implementation manners, in an eighth possible implementation manner, the establishing, by the first mobility router, a first tunnel to the proxy routing entity based on the address of the proxy routing entity includes: establishing, by the first mobility router, a binding relationship among the address of the first communication peer end, the address of the proxy routing entity, an address of the first mobile node, and tunnel information of the first tunnel; and sending, by the first mobility router, a tunnel establishment request message to the proxy routing entity, where the tunnel establishment request message includes an address of the first mobility router, the address of the first communication peer end, and the address of the first mobile node, so that a binding relationship among the address of the first mobility router, the address of the first communication peer end, the address of the first mobile node, and the tunnel information of the first tunnel is established in the proxy routing entity.

With reference to the eighth possible implementation manner, in a ninth possible implementation manner, the first mobility router is a mobility router in a visited network of the second mobile node, and the routing method further includes: receiving, by the first mobility router, a second data packet sent by the second mobile node to a second communication peer end, where the second data packet includes an address of the second communication peer end; acquiring, by the first mobility router, the address of the proxy routing entity based on the address of the second communication peer end; in a case in which the first mobility router determines, according to the address of the proxy routing entity, that the first tunnel is established, establishing, by the first mobility router, a binding relationship among the address of the second communication peer end, the address of the proxy routing entity, an address of the second mobile node, and the tunnel information of the first tunnel; and forwarding, by the first mobility router, the second data packet by using the first tunnel, where the second data packet includes the address of the second communication peer end, the address of the first mobility router, and the address of the second mobile node, so that a binding relationship among the address of the second communication peer end, the address of the first mobility router, the address of the second mobile node, and the tunnel information of the first tunnel is established in the proxy routing entity.

With reference to the first aspect or any one of the first to the ninth possible implementation manners of the first aspect, in a tenth possible implementation manner, the first mobile node is located in a mobile network, the first communication peer end is located in a fixed network, and the proxy routing entity is configured to connect the mobile network and the fixed network; and the acquiring, by the first mobility router, an address of a proxy routing entity based on the address of the first communication peer end includes: acquiring, by the first mobility router, the address of the proxy routing entity when determining that the address of the first communication peer end belongs to an address allocated by the fixed network.

According to a second aspect, a routing method is provided, including: receiving, by a server, a request message sent by a first mobility router or a second mobility router, where the request message is used to acquire an address of a proxy routing entity, the request message includes an address of a first communication peer end of a first mobile node, a binding relationship between the address of the proxy routing entity and the address of the first communication peer end is set on the server, the proxy routing entity is located in a communication path between the first mobility router and the first communication peer end, the first mobility router is a mobility router in a visited network of the first mobile node, and the second mobility router is a mobility router in a home network of the first mobile node; and sending, by the server, a response message, where the response message includes the address of the proxy routing entity.

With reference to the second aspect, in a first possible implementation manner, the server is a location management entity or a centralized server, and the sending, by the server, a response message includes: sending, by the server, the response message to the first mobility router or the second mobility router.

With reference to the second aspect, in a second possible implementation manner, the server is a domain name server, and the sending, by the server, a response message includes: sending, by the domain name server, a response message that includes a domain name corresponding to the address of the first communication peer end to the first mobility router or the second mobility router; and the routing method further includes: receiving, by the domain name server, a request message that includes the domain name corresponding to the address of the first communication peer end and is sent by the first mobility router or the second mobility router; and sending, by the domain name server, a response message that includes the address of the proxy routing entity to the first mobility router or the second mobility router.

According to a third aspect, a routing method is provided, including: establishing, by a second mobility router, a second tunnel to a first mobility router, where the second mobility router is a mobility router in a home network of a first mobile node, and the first mobility router is a mobility router in a visited network of the first mobile node; receiving, by the second mobility router by using the second tunnel, a first data packet that is forwarded by the first mobility router and is transmitted between the first mobile node and a first communication peer end, where the first data packet includes an address of the first communication peer end; acquiring, by the second mobility router, an address of a proxy routing entity based on the address of the first communication peer end, where the proxy routing entity is located in a communication path between the first mobility router and the first communication peer end; and sending, by the second mobility router, a route optimization command to the first mobility router, where the route optimization command includes the address of the proxy routing entity and is used to instruct the first mobility router to establish a first tunnel to the proxy routing entity.

With reference to the third aspect, in a first possible implementation manner, the acquiring, by the second mobility router, an address of a proxy routing entity based on the address of the first communication peer end includes: acquiring, by the second mobility router, the address of the proxy routing entity from a server based on the address of the first communication peer end, where a binding relationship between the address of the proxy routing entity and the address of the first communication peer end is set on the server.

With reference to the first possible implementation manner of the third aspect, in a second possible implementation manner, the server is a location management entity or a centralized server, and the acquiring, by the second mobility router, the address of the proxy routing entity from a server based on the address of the first communication peer end includes: sending, by the second mobility router, a request message that includes the address of the first communication peer end to the location management entity or the centralized server; and receiving, by the second mobility router, a response message that includes the address of the proxy routing entity and is returned by the location management entity or the centralized server.

With reference to the first possible implementation manner of the third aspect, in a third possible implementation manner, the server is a domain name server, and the acquiring, by the second mobility router, the address of the proxy routing entity from a server based on the address of the first communication peer end includes: sending, by the second mobility router, a request message that includes the address of the first communication peer end to the domain name server, to acquire the address of the proxy routing entity; receiving, by the second mobility router, a response message that includes a domain name corresponding to the address of the first communication peer end and is sent by the domain name server; sending, by the second mobility router, a request message that includes the domain name corresponding to the address of the first communication peer end to the domain name server; and receiving, by the second mobility router, a response message that includes the address of the proxy routing entity and is sent by the domain name server.

According to a fourth aspect, a routing method is provided, where the method includes: establishing, by a proxy routing entity, a first tunnel to a first mobility router, where the proxy routing entity is located in a communication path between the first mobility router and a first communication peer end of a first mobile node, and the first mobility router is a mobility router in a visited network of the first mobile node; and transmitting, by the proxy routing entity, a data packet between the first mobile node and the first communication peer end by using the first tunnel according to a binding relationship.

With reference to the fourth aspect, in a first possible implementation manner, the establishing, by a proxy routing entity, a first tunnel to a first mobility router includes: receiving, by the proxy routing entity, a tunnel establishment request message sent by the first mobility router, where the tunnel establishment request message includes an address of the first mobile node, an address of the first communication peer end, and an address of the first mobility router; and establishing, by the proxy routing entity, a binding relationship among the address of the first mobility router, the address of the first communication peer end, the address of the first mobile node, and tunnel information of the first tunnel.

With reference to the fourth aspect or the first possible implementation manner of the fourth aspect, in a second possible implementation manner, the routing method further includes: establishing, by the proxy routing entity, a third tunnel to a third mobility router; and tearing down, by the proxy routing entity, the first tunnel.

With reference to the fourth aspect or the first or the second possible implementation manner of the fourth aspect, in a third possible implementation manner, the routing method further includes: receiving, by the proxy routing entity, a second data packet that is forwarded by the first mobile node by using a second tunnel and is transmitted between a second mobile node and a second communication peer end, where the second data packet includes an address of the second mobile node, an address of the second communication peer end, and the address of the first mobility router; and establishing, by the proxy routing entity, a binding relationship among the address of the first mobility router, the address of the second mobile node, the address of the second communication peer end, and the tunnel information of the first tunnel.

With reference to the fourth aspect or any one of the first to the third possible implementation manners of the fourth aspect, in a fourth possible implementation manner, the first mobile node is located in a mobile network, the first communication peer end is located in a fixed network, and the proxy routing entity is configured to connect the mobile network and the fixed network.

According to a fifth aspect, a mobility router is provided, including: a receiving module, configured to receive a first data packet sent by a first mobile node to a first communication peer end, where the mobility router is a mobility router in a visited network of the first mobile node, and the first data packet includes an address of the first communication peer end; an acquiring module, configured to acquire an address of a proxy routing entity based on the address of the first communication peer end, where the proxy routing entity is located in a communication path between the mobility router and the first communication peer end; an establishing module, configured to establish a first tunnel to the proxy routing entity based on the address of the proxy routing entity; and a sending module, configured to transmit, by using the first tunnel, a data packet sent by the first communication peer end to the first mobile node.

With reference to the fifth aspect, in a first possible implementation manner, the establishing module is further configured to establish a second tunnel to a second mobility router before the first mobility router establishes the first tunnel to the proxy routing entity based on the address of the proxy routing entity, where the second mobility router is a mobility router in a home network of the first mobile node; and the sending module is further configured to: before establishment of the first tunnel is completed, transmit the first data packet between the first mobile node and the first communication peer end by using the second tunnel, and transmit, by using the first tunnel, a subsequent data packet that follows the first data packet and is sent by the first communication peer end to the first mobile node.

With reference to the first possible implementation manner of the fifth aspect, in a second possible implementation manner, the mobility router in the fifth aspect further includes: a teardown module, configured to tear down the first tunnel and the second tunnel when determining that the first mobile node communicates with the first communication peer end by using a third tunnel between a third mobility router and the proxy routing entity and a fourth tunnel between the third mobility router and the second mobility router.

With reference to the fifth aspect, in a third possible implementation manner, the mobility router in the fifth aspect further includes: a cache module, configured to: cache the first data packet before establishment of the first tunnel is completed; and/or forward, by using the first tunnel, the cached first data packet to the first communication peer end after establishment of the first tunnel is completed.

With reference to the fifth aspect or any one of the first to the third possible implementation manners of the fifth aspect, in a fourth possible implementation manner, the acquiring module acquires the address of the proxy routing entity from a server based on the address of the first communication peer end, where a binding relationship between the address of the proxy routing entity and the address of the first communication peer end is set on the server.

With reference to the fourth possible implementation manner of the fifth aspect, in a fifth possible implementation manner, the acquiring module sends a request message that includes the address of the first communication peer end to a location management entity or a centralized server, and receives a response message that includes the address of the proxy routing entity and is returned by the location management entity or the centralized server.

With reference to the fourth possible implementation manner of the fifth aspect, in a sixth possible implementation manner, the acquiring module sends a request message that includes the address of the first communication peer end to a domain name server, to acquire the address of the proxy routing entity; receives a response message that includes a domain name corresponding to the address of the first communication peer end and is returned by the domain name server; sends a request message that includes the domain name corresponding to the address of the first communication peer end to the domain name server; and receives a response message that includes the address of the proxy routing entity and is returned by the domain name server.

With reference to the first possible implementation manner of the fifth aspect, in a seventh possible implementation manner, the acquiring module receives a route optimization command sent by the second mobility router, where the route optimization command includes the address of the proxy routing entity and is used to instruct the mobility router to establish the first tunnel to the proxy routing entity; and acquires the address of the proxy routing entity from the route optimization command.

With reference to the fifth aspect or any one of the first to the seventh possible implementation manners of the fifth aspect, in an eighth possible implementation manner, the establishing module establishes a binding relationship among the address of the first communication peer end, the address of the proxy routing entity, an address of the first mobile node, and tunnel information of the first tunnel; and sends a tunnel establishment request message to the proxy routing entity, where the tunnel establishment request message includes an address of the mobility router, the address of the first communication peer end, and the address of the first mobile node, so that a binding relationship among the address of the mobility router, the address of the first communication peer end, the address of the first mobile node, and the tunnel information of the first tunnel is established in the proxy routing entity.

With reference to the eighth possible implementation manner of the fifth aspect, in a ninth possible implementation manner, the receiving module further receives a second data packet sent by a second mobile node to a second communication peer end, where the second data packet includes an address of the second communication peer end; the acquiring module further acquires the address of the proxy routing entity based on the address of the second communication peer end; in a case in which the establishing module determines, according to the address of the proxy routing entity, that the first tunnel is established, the establishing module further establishes a binding relationship among the address of the second communication peer end, the address of the proxy routing entity, an address of the second mobile node, and the tunnel information of the first tunnel; and the sending module further forwards the second data packet by using the first tunnel, where the second data packet includes the address of the second communication peer end, the address of the mobility router, and the address of the second mobile node, so that a binding relationship among the address of the second communication peer end, the address of the mobility router, the address of the second mobile node, and the tunnel information of the first tunnel is established in the proxy routing entity.

With reference to the fifth aspect or any one of the first to the ninth possible implementation manners of the fifth aspect, in a tenth possible implementation manner, the first mobile node is located in a mobile network, the first communication peer end is located in a fixed network, the proxy routing entity is configured to connect the mobile network and the fixed network, and the acquiring module acquires the address of the proxy routing entity when determining that the address of the first communication peer end belongs to an address allocated by the fixed network.

According to a sixth aspect, a server is provided, including: a receiving module, configured to receive a request message sent by a first mobility router or a second mobility router, where the request message is used to acquire an address of a proxy routing entity, the request message includes an address of a first communication peer end of a first mobile node, a binding relationship between the address of the proxy routing entity and the address of the first communication peer end is set on the server, the proxy routing entity is located in a communication path between the first mobility router and the first communication peer end, the first mobility router is a mobility router in a visited network of the first mobile node, and the second mobility router is a mobility router in a home network of the first mobile node; and a sending module, configured to send a response message, where the response message includes the address of the proxy routing entity.

With reference to the sixth aspect, in a first possible implementation manner, the server is a location management entity or a centralized server, and the sending module is further configured to send the response message to the first mobility router or the second mobility router.

With reference to the sixth aspect, in a second possible implementation manner, the server is a domain name server, and the sending module sends a response message that includes a domain name corresponding to the address of the first communication peer end to the first mobility router or the second mobility router; the receiving module is further configured to receive a request message that includes the domain name corresponding to the address of the first communication peer end and is sent by the first mobility router or the second mobility router; and the sending module is further configured to send a response message that includes the address of the proxy routing entity to the first mobility router or the second mobility router.

According to a seventh aspect, a mobility router is provided, including: an establishing module, configured to establish a second tunnel to a first mobility router, where the mobility router is a mobility router in a home network of a first mobile node, and the first mobility router is a mobility router in a visited network of the first mobile node; a receiving module, configured to receive, by using the second tunnel, a first data packet that is forwarded by the first mobility router and is transmitted between the first mobile node and a first communication peer end, where the first data packet includes an address of the first communication peer end; an acquiring module, configured to acquire an address of a proxy routing entity based on the address of the first communication peer end, where the proxy routing entity is located in a communication path between the first mobility router and the first communication peer end; and a sending module, configured to send a route optimization command to the first mobility router, where the route optimization command includes the address of the proxy routing entity and is used to instruct the first mobility router to establish a first tunnel to the proxy routing entity.

With reference to the seventh aspect, in a first possible implementation manner, the acquiring module acquires the address of the proxy routing entity from a server based on the address of the first communication peer end, where a binding relationship between the address of the proxy routing entity and the address of the first communication peer end is set on the server.

With reference to the first possible implementation manner of the seventh aspect, in a second possible implementation manner, the acquiring module sends a request message that includes the address of the first communication peer end to a location management entity or a centralized server, and receives a response message that includes the address of the proxy routing entity and is returned by the location management entity or the centralized server.

With reference to the first possible implementation manner of the seventh aspect, in a third possible implementation manner, the acquiring module sends a request message that includes the address of the first communication peer end to a domain name server, to acquire the address of the proxy routing entity, receives a response message that includes a domain name corresponding to the address of the first communication peer end and is sent by the domain name server, sends a request message that includes the domain name corresponding to the address of the first communication peer end to the domain name server, and receives a response message that includes the address of the proxy routing entity and is sent by the domain name server.

According to an eighth aspect, a proxy routing entity is provided, including: an establishing module, configured to establish a first tunnel to a first mobility router, where the proxy routing entity is located in a communication path between the first mobility router and a first communication peer end of a first mobile node, and the first mobility router is a mobility router in a visited network of the first mobile node; and a sending module, configured to transmit a data packet between the first mobile node and the first communication peer end by using the first tunnel according to a binding relationship.

With reference to the eighth aspect, in a first possible implementation manner, the establishing module receives a tunnel establishment request message sent by the first mobility router, where the tunnel establishment request message includes an address of the first mobile node, an address of the first communication peer end, and an address of the first mobility router; and establishes a binding relationship among the address of the first mobility router, the address of the first communication peer end, the address of the first mobile node, and tunnel information of the first tunnel.

With reference to the eighth aspect or the first possible implementation manner of the eighth aspect, in a second possible implementation manner, the proxy routing entity in the eighth aspect further includes: a teardown module, where the establishing module further establishes a third tunnel to a third mobility router, and the teardown module tears down the first tunnel after the third tunnel is established.

With reference to the eighth aspect or the first or the second possible implementation manner of the eighth aspect, in a third possible implementation manner, the proxy routing entity in the eighth aspect further includes: a receiving module, configured to receive a second data packet that is forwarded by the first mobile node by using a second tunnel and is transmitted between a second mobile node and a second communication peer end, where the second data packet includes an address of the second mobile node, an address of the second communication peer end, and the address of the first mobility router; where the establishing module is configured to establish a binding relationship among the address of the first mobility router, the address of the second mobile node, the address of the second communication peer end, and the tunnel information of the first tunnel.

With reference to the eighth aspect or any one of the first to the third possible implementation manners of the eighth aspect, in an eighth possible implementation manner, the first mobile node is located in a mobile network, the first communication peer end is located in a fixed network, and the proxy routing entity is configured to connect the mobile network and the fixed network.

According to the technical solutions in the embodiments of the present invention, when a mobile node moves to a visited network, a mobility router in the visited network establishes a tunnel to a proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

It should be understood that, the technical solutions of the present invention may be applied to various communications systems, such as a Global System of Mobile communication (GSM), a Code Division Multiple Access (CDMA) system, a Wideband Code Division Multiple Access (WCDMA) system, a General Packet Radio Service (GPRS) system, a Long Term Evolution (LTE) system, a Advanced long term evolution (LTE-A) system, a Universal Mobile Telecommunication System (UMTS), and a mobile IP network, which are not limited in the embodiments of the present invention. However, for ease of description, the embodiments of the present invention are described by using a mobile IP network as an example.

It should be further understood that in the embodiments of the present invention, a User Equipment (UE) includes but is not limited to a Mobile Station (MS), a mobile terminal (Mobile Terminal), a mobile telephone (Mobile Telephone), a handset (handset), portable equipment (portable equipment), and the like. The user equipment may communicate with one or more core networks via a Radio Access Network (RAN). For example, the user equipment may be a mobile telephone (or referred to as a "cellular" telephone), or a computer having a wireless communication function; or the user equipment may be a portable, pocket-sized, handheld, computer built-in, or in-vehicle mobile apparatus.

Figure 1:
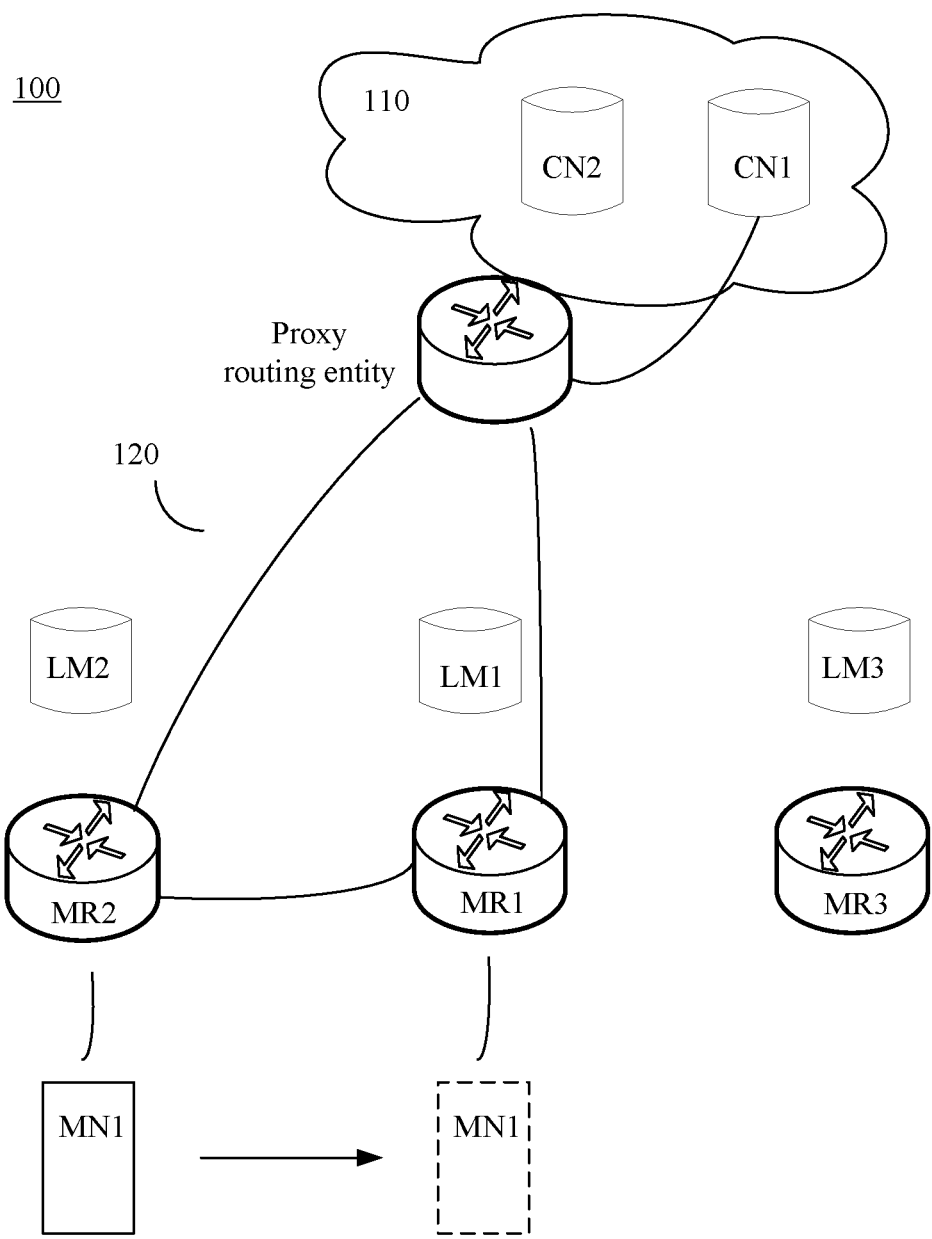
FIG. 1 is a schematic diagram of an architecture of a communications system according to an embodiment of the present invention.

FIG. 1 is a schematic diagram of an architecture of a communications system 100 according to an embodiment of the present invention.

Referring to FIG. 1, the communications system 100 may include a fixed network 110, a mobile IP network 120, and an MN1. The mobile IP network 120 may be, for example, an IPv4 mobile network or an IPv6 mobile network, including routers: a MR2, a MR1, a MR3, and a Proxy-MR, and location management entities: a LM2, a LM1, and a LM3. The Proxy-MR may be a router or a gateway located on a border of the mobile IP network 120, for example, a border router (Border Router) or a border gateway (Border Gateway, Border GW). The Proxy-MR may be located in a path through which the mobile IP network 120 communicates with the external fixed network 110. The fixed network 110 may be, for example, a PDN or the Internet, and may include communication peer ends of a mobile node: a CN1 and a CN2. The CN1 and the CN2 may be servers (for example, IP servers), or may be clients.

For example, when the MN1 accesses the mobile IP network 120 from the MR2, the MR2 allocates an address (for example, an IP address) to the MN1, and the MR1 uses the address to establish a session with the communication peer end CN1. When the MN1 moves from a network in which the MR2 is located to a network in which the MR1 is located, and accesses the mobile IP network 120 from the MR1, to maintain continuity of an original session, a data packet of the session may be forwarded through a home network, that is, a network that allocates an address used for the session, for example, the network in which the MR2 in FIG. 1 is located. A tunnel may be established between the MR2 (that is, an anchor in the home network of the MN1, H-MR) and the MR1 (an anchor in a visited network or a current network of the MN1, C-MR) to forward data, so as to maintain the continuity of the original session.

In this case, if data of a subsequent session is also forwarded by using the foregoing tunnel, route redundancy is caused. Therefore, to avoid route redundancy and optimize routing, according to this embodiment of the present invention, a tunnel may be established between the MR1 and the Proxy-MR, so that subsequent data between the MN1 and the CN1 is forwarded by using the tunnel between the MR1 and the Proxy-MR.

It should be understood that, in a case in which maintaining the continuity of the session is not considered, the tunnel between the MR2 and the MR1 may not be established, but the tunnel between the MR1 and the Proxy-MR is directly established when the MN1 accesses the mobile IP network 120 from the MR2.

It should be noted that an MN may have multiple addresses, and the multiple addresses are allocated by MRs in different home networks. Therefore, an MN may have multiple H-MRs, but an MN has only one C-MR.

It should be understood that the foregoing embodiment is only an example for illustration, and the architecture of the communications system in this embodiment of the present invention is not limited thereto. For example, the architecture of the communications system may include more or less LMs and MRs, and is not limited to three LMs or three MRs.

Multiple LMs may be mutually independent, and are in a one-to-one correspondence with multiple MRs, that is, the multiple LMs are location management entities corresponding to the multiple MRs. One LM address may be configured for each MR. Alternatively, multiple LMs may be distributed, that is, the multiple LMs are interconnected, where the multiple LMs are an entirety, only one LM address needs to be statically configured for multiple MRs, and all the MRs may share the LM address. For another example, a centralized LM may be used, that is, for multiple MRs, only one LM exists, and only one LM address needs to be statically configured for the multiple MRs.

Alternatively, in another embodiment, the Proxy-MR may be replaced with a router or a gateway located outside the mobile IP network 120, which is not limited in this embodiment of the present invention.

Figure 2:
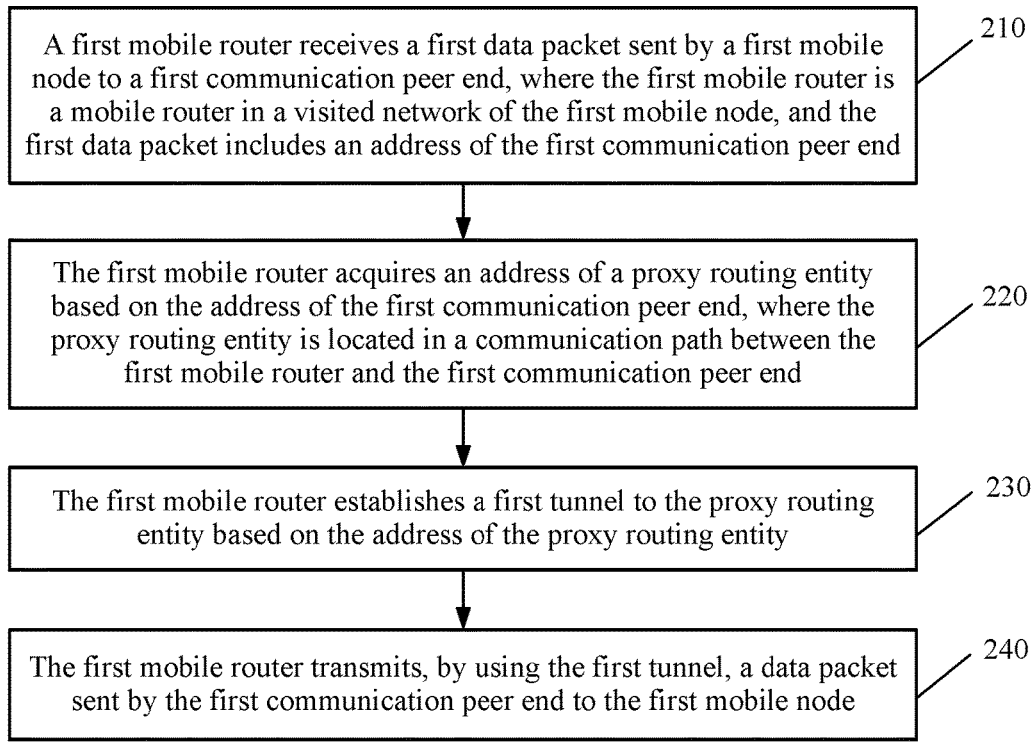
FIG. 2 is a schematic flowchart of a routing method according to an embodiment of the present invention.

FIG. 2 is a schematic flowchart of a routing method according to an embodiment of the present invention. The method in FIG. 2 is performed by a mobility router.

210. A first mobility router receives a first data packet sent by a first mobile node to a first communication peer end, where the first mobility router is a mobility router in a visited network of the first mobile node, and the first data packet includes an address of the first communication peer end.

The first mobility router may be a mobility router in a mobile IP network. The first communication peer end may be a communications device in a fixed network, for example, a server or a client in a PDN network or the Internet, and this embodiment of the present invention is not limited thereto. For example, the first communication peer end may be a mobile node in a mobile network.

When the first mobile node sends a data packet to the first communication peer end, a source address included in the data packet is an address of the first mobile node, and a destination address is the address of the first communication peer end. An LP address of the first mobile node is allocated by a location management entity in a home network. The address of the first communication peer end may be allocated by a network in which the first communication peer end is located. The address of the first mobile node may be the IP address of the first mobile node, which is not limited in this embodiment of the present invention. For example, the address of the first mobile node may be another identifier used for indicating a location of the first mobile node.

220. The first mobility router acquires an address of a proxy routing entity based on the address of the first communication peer end, where the proxy routing entity is located in a communication path between the first mobility router and the first communication peer end.

For example, the proxy routing entity may be located between the mobile network and the communication peer end, that is, the proxy routing entity is located in the path between the mobility router in the mobile network and the communication peer end. The proxy routing entity may be a mobility router in the mobile network, for example, a border router or a border gateway in the mobile network, or may be a physical entity or a logical entity disposed on a border router or a border gateway in the mobile network. There is a correspondence or a binding relationship between the address of the first communication peer end and the address of the proxy routing entity.

230. The first mobility router establishes a first tunnel to the proxy routing entity based on the address of the proxy routing entity.

For example, when establishing the first tunnel, the first mobility router may establish a correspondence or a binding relationship between the address of the proxy routing entity and tunnel information, and send a tunnel establishment request message that includes an address of the first mobility router to the proxy routing entity, so that a correspondence or a binding relationship between the address of the first mobility router and the tunnel information is established in the proxy routing entity.

240. The first mobility router transmits, by using the first tunnel, a data packet sent by the first communication peer end to the first mobile node.

Specifically, when a mobile node accesses a mobility router in a home network, a location management entity in the home network allocates an IP address to the mobile node, so that the mobile node can use the IP address to communicate with a communication peer end. When the mobile node moves from the home network to a visited network, a mobility router in the visited network acquires an address of the communication peer end from a data packet sent by the mobile node, and acquires an address of a proxy routing entity according to the address of the communication peer end. The mobility router establishes a tunnel to the proxy routing entity according to the address of the proxy routing entity. When receiving a data packet transmitted between the communication node and the mobile node, the mobility router and the proxy routing entity may forward the data packet according to a correspondence in a binding list.

According to this embodiment of the present invention, when a mobile node moves to a visited network, a mobility router in the visited network establishes a tunnel to a proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

Optionally, in another embodiment, before the first mobility router establishes the first tunnel to the proxy routing entity based on the address of the proxy routing entity, the routing method in FIG. 2 further includes: the first mobility router establishes a second tunnel to a second mobility router, where the second mobility router is a mobility router in a home network of the first mobile node; and before completing establishment of the first tunnel, the first mobility router transmits the first data packet between the first mobile node and the first communication peer end by using the second tunnel; and that the first mobility router transmits, by using the first tunnel, a data packet sent by the first communication peer end to the first mobile node includes: the first mobility router transmits, by using the first tunnel, a subsequent data packet that follows the first data packet and is sent by the first communication peer end to the first mobile node.

For example, when the first mobile node moves to the visited network, the second tunnel may be established between the first mobility router and the second mobility router in the home network, so that a data packet of an original session can be forwarded by using the second tunnel. For example, when receiving the first data packet, the first mobility router forwards the first data packet to the second mobility router by using the second tunnel, the second mobility router forwards the first data packet to the proxy routing entity, and the proxy routing entity forwards the first data packet to the communication peer end. Because the first data packet can be forwarded in a timely manner by using the second tumid between the mobility router in the visited network and the mobility router in the home network, continuity of the original session is ensured.

Optionally, in another embodiment, the routing method in FIG. 2 further includes: the first mobility router tears down the first tunnel and the second tunnel when determining that the first mobile node communicates with the first communication peer end by using a third tunnel between a third mobility router and the proxy routing entity and a fourth tunnel between the third mobility router and the second mobility router.

For example, when the first mobile node moves again from a network in which the first mobility router is located to a network in which the third mobility router is located, the third mobility router may establish the fourth tunnel to the second mobility router in the home network, and establish the third tunnel to the proxy routing entity, where a tunnel establishment method is similar to the foregoing tunnel establishment method in the embodiment in FIG. 2, and details are not described herein again. After the first mobile node moves to the network in which the third mobility router is located, the data packet between the first mobile node and the first communication peer end may be transmitted by using the fourth tunnel established by the third mobility router; therefore, after establishing the third tunnel and the fourth tunnel, the third mobility router may notify the first mobility router, the proxy routing entity, and the second mobility router to tear down the first tunnel and the second tunnel, that is, the first mobility router and the second mobility router delete a binding relationship of the second tunnel in a binding list, and the first mobility router and the proxy routing entity delete a binding relationship of the first tunnel in a binding list.

A process of establishing the third tunnel is similar to a process of establishing the first tunnel, a process of establishing the fourth tunnel is similar to a process of establishing the second tunnel, and details are not described herein again. In this embodiment of the present invention, the third tunnel is established between the third mobility router and the proxy routing entity, and therefore, when receiving a data packet, the third mobility router may directly forward the data packet to the proxy routing entity by using the third tunnel without using the first mobility router and the first tunnel to forward the data packet to the proxy routing entity, which avoids route redundancy. In addition, because the first tunnel and the second tunnel are deleted after the third tunnel and the fourth tunnel are established, the continuity of the session is ensured and tunnel resources are saved.

Optionally, in another embodiment, the method in FIG. 2 further includes: the first mobility router caches the first data packet before completing establishment of the first tunnel; the first mobility router forwards, by using the first tunnel, the cached first data packet to the first communication peer end after completing establishment of the first tunnel.

Because the first data packet may be temporarily cached in the first mobility router, and may be forwarded, by using the first tunnel, to the proxy routing entity after the first tunnel is established, the continuity of the original session is ensured, and establishing a tunnel between the mobility router in the home network and the mobility router in the visited network can be avoided.

According to this embodiment of the present invention, in step 220, the first mobility router may acquire the address of the proxy routing entity from a server based on the address of the first communication peer end, where a binding relationship between the address of the proxy routing entity and the address of the first communication peer end is set on the server.

For example, the binding relationship between the address of the proxy routing entity and the address of the first communication peer end may be set on a server (for example, a database or a domain name server) in a centralized manner, or may be distributed in location management entities in networks in which mobility routers are located. When establishing a tunnel to the proxy routing entity, each mobility router needs to know the address of the proxy routing entity, and the mobility router may obtain the address of the communication peer end from the data packet sent by the mobile node. When the mobility router needs the address of the proxy routing entity, the mobility router may send a request message that carries the address of the communication peer end to the server, to request the address of the proxy routing entity, and the server may query the address of the corresponding proxy routing entity according to the address of the communication peer end, and return the address of the proxy routing entity to the mobility router by using a response message.

According to this embodiment of the present invention, the server may be a location management entity or a centralized server. In step 220, the first mobility router may send a request message that includes the address of the first communication peer end to the location management entity or the centralized server, and receive a response message that includes the address of the proxy routing entity and is returned by the location management entity or the centralized server.

According to this embodiment of the present invention, the server may be a domain name server. In step 220, the first mobility router may send a request message that includes the address of the first communication peer end to the domain name server, to acquire the address of the proxy routing entity; the first mobility router may receive a response message that includes a domain name corresponding to the address of the first communication peer end and is returned by the domain name server; the first mobility router may send a request message that includes the domain name corresponding to the address of the first communication peer end to the domain name server; and the first mobility router may receive a response message that includes the address of the proxy routing entity and is returned by the domain name server.

According to this embodiment of the present invention, in step 220, the first mobility router receives a route optimization command sent by the second mobility router, where the route optimization command includes the address of the proxy routing entity and is used to instruct the first mobility router to establish the first tunnel to the proxy routing entity; and the first mobility router acquires the address of the proxy routing entity from the route optimization command.

According to this embodiment of the present invention, in step 230, the first mobility router may establish a binding relationship among the address of the first communication peer end, the address of the proxy routing entity, the address of the first mobile node, and the tunnel information of the first tunnel; and the first mobility router may send a tunnel establishment request message to the proxy routing entity, where the tunnel establishment request message includes the address of the first mobility router, the address of the first communication peer end, and the address of the first mobile node, so that a binding relationship among the address of the first mobility router, the address of the first communication peer end, the address of the first mobile node, and the tunnel information of the first tunnel is established in the proxy routing entity.

For example, when the tunnel between the first mobility router and the proxy routing entity is being established, binding lists may be separately established in the first mobility router and the proxy routing entity. In the first mobility router, the binding list may include a correspondence or a binding relationship among the address of the proxy routing entity, the address of the first communication peer end, the IP address of the first mobile node, and the tunnel information; in the proxy routing entity, the binding list may include a correspondence or a binding relationship among the address of the first mobility router, the address of the first communication peer end, the IP address of the first mobile node, and the tunnel information.

According to this embodiment of the present invention, the tunnel establishment request message is a create bearer request message, and a tunnel establishment response message is a create bearer response message; or the tunnel establishment request message is a proxy binding update message, and a tunnel establishment response message is a proxy binding acknowledgement message.

According to this embodiment of the present invention, the first mobility router is a mobility router in a visited network of a second mobile node, and the routing method in FIG. 1 further includes: the first mobility router receives a second data packet sent by the second mobile node to a second communication peer end, where the second data packet includes an address of the second communication peer end; the first mobility router acquires the address of the proxy routing entity based on the address of the second communication peer end; in a case in which the first mobility router determines, according to the address of the proxy routing entity, that the first tunnel is established, the first mobility router establishes a binding relationship among the address of the second communication peer end, the address of the proxy routing entity, an address of the second mobile node, and the tunnel information of the first tunnel; and the first mobility router forwards the second data packet by using the first tunnel, where the second data packet includes the address of the second communication peer end, the address of the first mobility router, and the address of the second mobile node, so that a binding relationship among the address of the second communication peer end, the address of the first mobility router, the address of the second mobile node, and the tunnel information of the first tunnel is established in the proxy routing entity.

A method for the first mobility router to acquire the address of the proxy routing entity when receiving the second data packet sent by the second mobile node is similar to that in the foregoing embodiment, and details are not described herein again. After obtaining the address of the proxy routing entity, the first mobility router may determine whether the first tunnel corresponding to the proxy routing entity is established, that is, query whether a binding relationship between the address of the proxy routing entity and the address of the first mobility router exists in the foregoing binding list. If the first tunnel is already established, the data packet between the second mobile node and the second communication peer end may be forwarded by using the first tunnel. In this case, it is only required to add a binding relationship or a correspondence among the address of the second communication peer end, the address of the second mobile node, and the tunnel information of the first tunnel to the binding list. In this case, because a session between the second mobile node and the second communication peer end may share a same tunnel with a session between the first mobile node and the first communication peer end, a tunnel establishment process is simplified, and tunnel resources are saved.

Optionally, in another embodiment, after receiving a tunnel establishment response message returned by the proxy routing entity, the first mobility router completes establishment of the first tunnel, and this embodiment of the present invention is not limited thereto. For example, establishment of the first tunnel may be completed by merely sending the tunnel establishment request message to the proxy routing entity.

According to this embodiment of the present invention, the first mobile node is located in a mobile network, the first communication peer end is located in a fixed network, and the proxy routing entity is configured to connect the mobile network and the fixed network. In step 220, the first mobility router may acquire the address of the proxy routing entity when determining that the address of the first communication peer end belongs to an address allocated by the fixed network.

That is, when the address of the first communication peer end belongs to the address allocated by the fixed network, the method in this embodiment of the present invention may be executed, that is, the tunnel is established between the first mobility router and the proxy routing entity. When the address of the first communication peer end belongs to an address allocated by the mobile network, a tunnel may be established between the first mobility router and a mobility router accessed by the first communication peer end.

Figure 3:
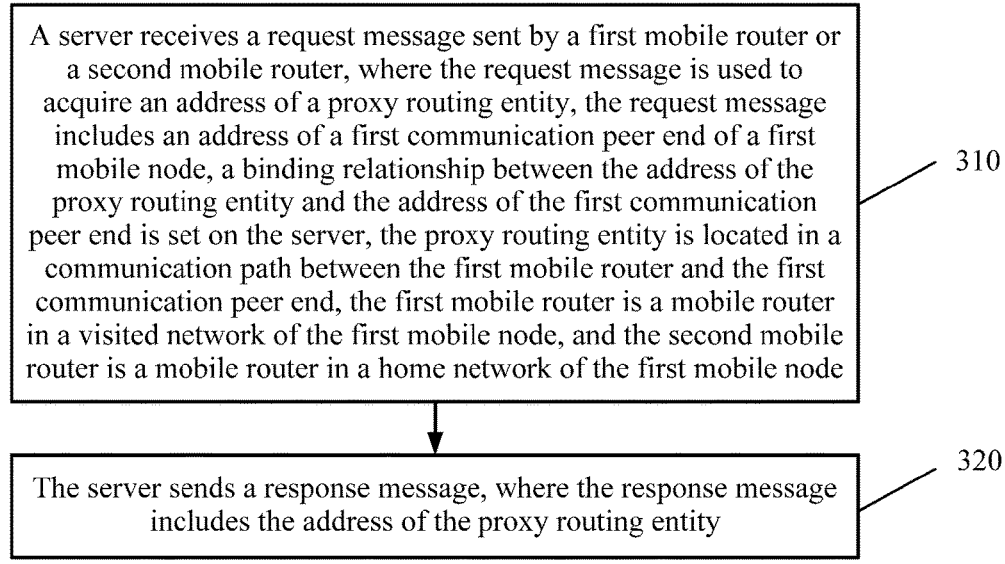
FIG. 3 is a schematic flowchart of a routing method according to another embodiment of the present invention.

FIG. 3 is a schematic flowchart of a routing method according to another embodiment of the present invention. The method in FIG. 3 is executed by a server. The embodiment in FIG. 3 is corresponding to the embodiment in FIG. 2, and detailed descriptions are appropriately omitted herein.

310. A server receives a request message sent by a first mobility router or a second mobility router, where the request message is used to acquire an address of a proxy routing entity, the request message includes an address of a first communication peer end of a first mobile node, a binding relationship between the address of the proxy routing entity and the address of the first communication peer end is set on the server, the proxy routing entity is located in a communication path between the first mobility router and the first communication peer end, the first mobility router is a mobility router in a visited network of the first mobile node, and the second mobility router is a mobility router in a home network of the first mobile node.

320. The server sends a response message, where the response message includes the address of the proxy routing entity.

According to this embodiment of the present invention, when a mobile node moves to a visited network, a first mobility router or a second mobility router may acquire an address of a proxy routing entity from a server, and establish a tunnel between the first mobility router and the proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

According to this embodiment of the present invention, the server is a location management entity or a centralized server. In step 320, the server sends the response message to the first mobility router or the second mobility router.

According to this embodiment of the present invention, the server may be a domain name server. In step 320, the domain name server sends a response message that includes a domain name corresponding to the address of the first communication peer end to the first mobility router or the second mobility router. The routing method further includes:

the domain name server receives a request message that includes the domain name corresponding to the address of the first communication peer end and is sent by the first mobility router or the second mobility router; and the domain name server sends a response message that includes the address of the proxy routing entity to the first mobility router or the second mobility router.

Figure 4:
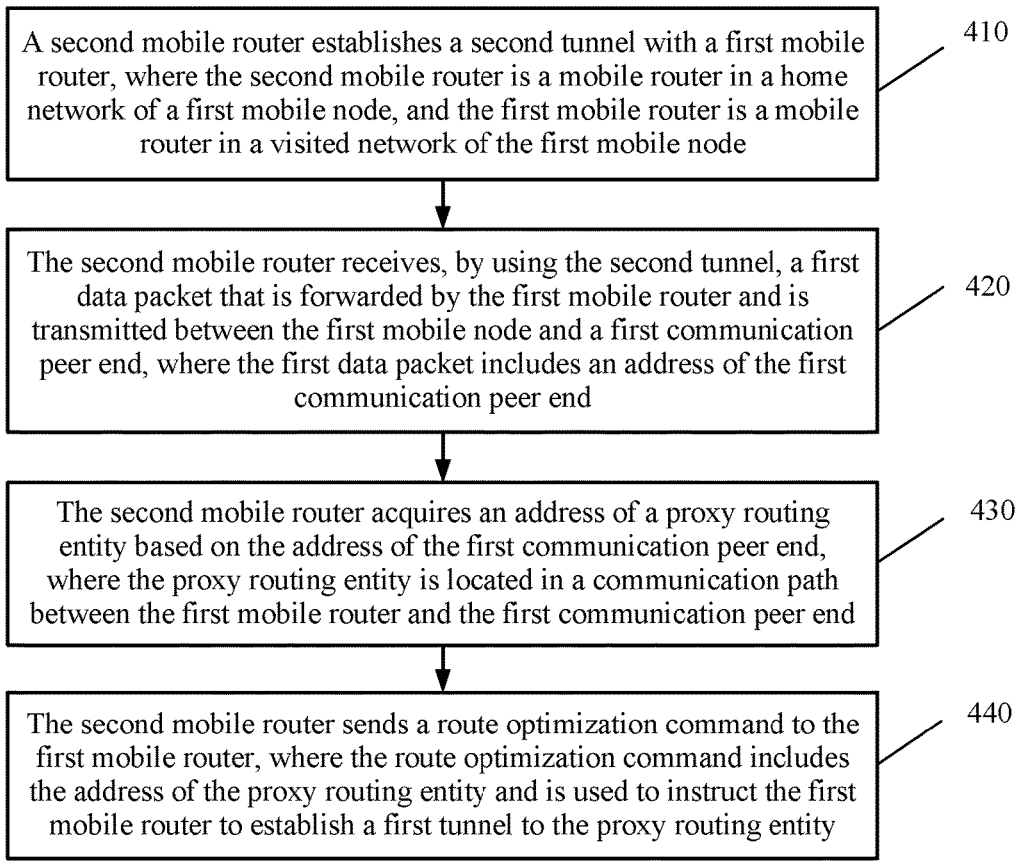
FIG. 4 is a schematic flowchart of a routing method according to another embodiment of the present invention.

FIG. 4 is a schematic flowchart of a routing method according to another embodiment of the present invention. The method in FIG. 4 is executed by a second mobility router (that is, a mobility router in a home network). The embodiment in FIG. 4 is corresponding to the embodiments in FIG. 2 and FIG. 3, and detailed descriptions are appropriately omitted herein.

410. A second mobility router establishes a second tunnel to a first mobility router, where the second mobility router is a mobility router in a home network of a first mobile node, and the first mobility router is a mobility router in a visited network of the first mobile node.

420. The second mobility router receives, by using the second tunnel, a first data packet that is forwarded by the first mobility router and is transmitted between the first mobile node and a first communication peer end, where the first data packet includes an address of the first communication peer end.

430. The second mobility router acquires an address of a proxy routing entity based on the address of the first communication peer end, where the proxy routing entity is located in a communication path between the first mobility router and the first communication peer end.

440. The second mobility router sends a route optimization command to the first mobility router, where the route optimization command includes the address of the proxy routing entity and is used to instruct the first mobility router to establish a first tunnel to the proxy routing entity.

According to this embodiment of the present invention, when a mobile node moves to a visited network, a mobility router in the visited network may firstly establish a tunnel to a second mobility router, and the second mobility router instructs the first mobility router to establish a tunnel to a proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

In step 430, the second mobility router may acquire the address of the proxy routing entity from a server based on the address of the first communication peer end, where a binding relationship between the address of the proxy routing entity and the address of the first communication peer end is set on the server.

According to this embodiment of the present invention, the server may be a location management entity or a centralized server. In step 430, the second mobility router sends a request message that includes the address of the first communication peer end to the location management entity or the centralized server, and the second mobility router receives a response message that includes the address of the proxy routing entity and is returned by the location management entity or the centralized server.

According to this embodiment of the present invention, the server may be a domain name server. In step 430, the second mobility router sends a request message that includes the address of the first communication peer end to the domain name server, to acquire the address of the proxy routing entity; the second mobility router receives a response message that includes a domain name corresponding to the address of the first communication peer end and is sent by the domain name server; the second mobility router sends a request message that includes the domain name corresponding to the address of the first communication peer end to the domain name server; and the second mobility router receives a response message that includes the address of the proxy routing entity and is sent by the domain name server.

Figure 5:
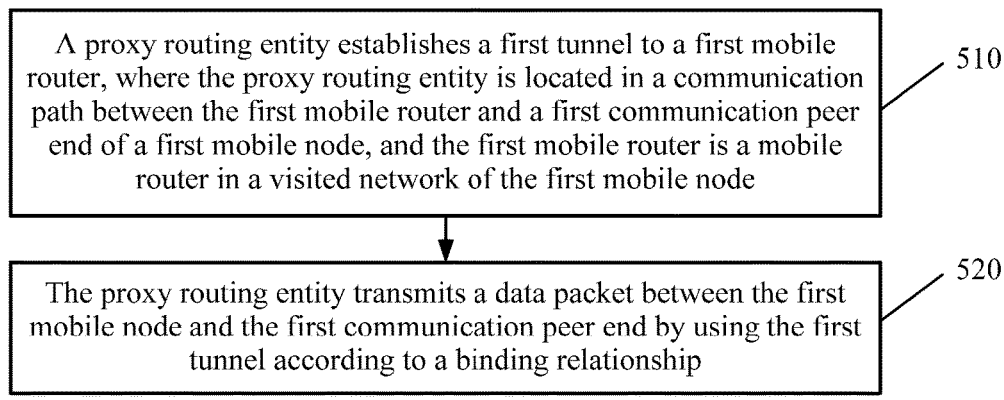
FIG. 5 is a schematic flowchart of a routing method according to another embodiment of the present invention.

FIG. 5 is a schematic flowchart of a routing method according to another embodiment of the present invention. The method in FIG. 5 is executed by a proxy routing entity. The embodiment in FIG. 5 is corresponding to the embodiments in FIG. 2 to FIG. 4, and detailed descriptions are appropriately omitted herein.

510. A proxy routing entity establishes a first tunnel to a first mobility router, where the proxy routing entity is located in a communication path between the first mobility router and a first communication peer end of a first mobile node, and the first mobility router is a mobility router in a visited network of the first mobile node.

520. The proxy routing entity transmits a data packet between the first mobile node and the first communication peer end by using the first tunnel according to a binding relationship.

According to this embodiment of the present invention, when a mobile node moves to a visited network, a mobility router in the visited network may establish a tunnel to a proxy router, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

According to this embodiment of the present invention, in step 510, the proxy routing entity receives a tunnel establishment request message sent by the first mobility router, where the tunnel establishment request message includes an address of the first mobile node, an address of the first communication peer end, and an address of the first mobility router; and the proxy routing entity establishes a binding relationship among the address of the first mobility router, the address of the first communication peer end, the address of the first mobile node, and tunnel information of the first tunnel.

Optionally, in another embodiment, the routing method in FIG. 5 further includes: the proxy routing entity establishes a third tunnel to a third mobility router; and the proxy routing entity tears down the first tunnel.

Optionally, in another embodiment, the routing method in FIG. 5 further includes: the proxy routing entity receives a second data packet that is forwarded by the first mobile node by using a second tunnel and is transmitted between a second mobile node and a second communication peer end, where the second data packet includes an address of the second mobile node, an address of the second communication peer end, and the address of the first mobility router; and the proxy routing entity establishes a binding relationship among the address of the first mobility router, the address of the second mobile node, the address of the second communication peer end, and the tunnel information of the first tunnel.

According to this embodiment of the present invention, the first mobile node is located in a mobile network, the first communication peer end is located in a fixed network, and the proxy routing entity is configured to connect the mobile network and the fixed network.

Figure 6:
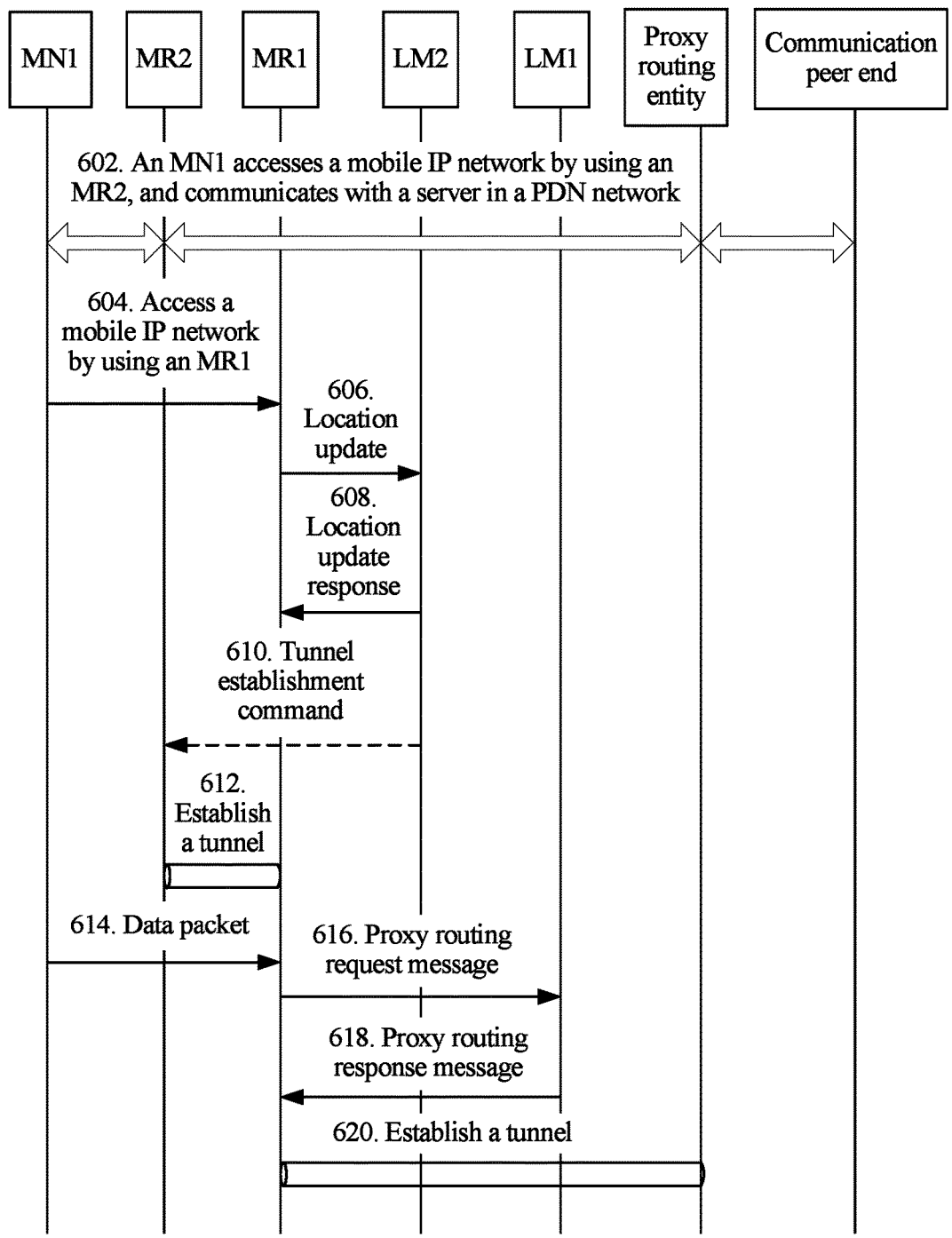
FIG. 6 is a schematic flowchart of a routing process according to an embodiment of the present invention.

FIG. 6 is a schematic flowchart of a routing process according to an embodiment of the present invention. The embodiment in FIG. 6 is an example of the methods in FIG. 2 to FIG. 5.

In this embodiment, referring to FIG. 1, an example in which an MN in a mobile IP network communicates with a communication peer end located in a PDN is used for description.

According to this embodiment of the present invention, a proxy mobile routing (Proxy-MR) entity may be added to a data transmission path between the MN and the communication peer end, and may be disposed on a border MR or a border gateway in the mobile IP network 120, or may be independently disposed in the data transmission path. The Proxy-MR entity has a function of establishing a route optimization tunnel to the MR in the mobile IP network and transmitting a data packet by using the route optimization tunnel. This embodiment of the present invention includes the following content.

602. An MN1 accesses a mobile IP network by using an MR2, and communicates with a server in a PDN network.

The MR2 is a home mobility router (H-MR) of the MN1. When the MN1 accesses the mobile IP network from the MR2 to perform a session, the MR2 allocates an IP address (an MN IP address for short) to the session of the MN1. In this way, the MN1 may use the MN IP address to perform data transmission, so that a data packet is transmitted between the MN1 and a communication peer end CN1 by using the MR2 and a Proxy-MR entity. When the MN1 accesses the mobile IF network, a location of the MN1 may be managed and tracked in an LM2, so that the MR2 can route the data packet of the MN1 to a correct address. For example, a binding list {MN IP: H-MR} of the MN1 is set in the LM2.

604. When the MN1 moves from the network in which the MR2 is located to a network in which an MR1 is located, the MR1 detects access by the MN1 and acquires a valid IP address of the MN1 (that is, an MN IP address), and in this case, the MR1 is a current mobility router (C-MR) of the MN1, where for example, the MR1 acquires the MN IP address from a data packet sent by the MN1.

606. The MR1 sends a location update (Location Update) message to an LM2 in the network in which the MN1 is located, to update location information of the MN1 stored in the LM2 to latest location information of the MN1.

The location update message includes the MN IP address and an address of the MR1. In this embodiment, an example in which the MN1 has one IP address is used for description. It should be understood that because the MN1 may have multiple valid IP addresses (that is, addresses allocated by multiple home networks), in this case, the location update message may be sent by the MR1 to multiple LMs in the multiple home networks. A specific method is similar, and details are not described herein again.

608. After receiving the location update message sent by the MR1, the LM2 records an address of the current router MR1 of the MN1, that is, an address of the C-MR, and returns a location update response message to the MR1.

For example, in the LM2, the binding list {MN IP: H-MR} of the MN1 is modified into {MN IP: H-MR: C-MR}. The LM2 returns the response message to the MR1, where the response message includes an address of the MR2, that is, an address of the H-MR. Step 608 is optional.

When the MN1 moves to the network in which the MR1 is located, the MR1 may initiate tunnel establishment, or the MR2 may initiate tunnel establishment. In a case in which the MR2 initiates tunnel establishment, step 608 may be replaced with the following step 610.

610. The LM2 sends a tunnel establishment command to the MR2.

To enable the H-MR to initiate tunnel establishment, the LM2 may notify the MR2 of address information of the MR1. For example, after receiving the location update message, the LM2 may send the tunnel establishment command to the MR2, where the tunnel establishment command includes the MN IP address and the address of the MR1, and then the MR2 initiates tunnel establishment.

612. The MR2 establishes a tunnel to the MR1.

The following describes in detail a process of establishing the tunnel between the two mobility routers.

For example, when the tunnel between the two mobility routers is established by using the GPRS Tunneling Protocol (GTP), a method is as follows:

When tunnel establishment is initiated by the MR1, the MR1 sends a create bearer request (Create Bearer Request) message to the MR2, and the MR2 returns a create bearer response (Create Bearer Response) message to the MR1. The create bearer request message may include the address information of the MR1, and in addition, the create bearer request message may further include port information of the MR1.

Alternatively, in another embodiment, when tunnel establishment is initiated by the MR2, the MR2 sends a create bearer request message to the MR1, and the MR1 returns a create bearer response message to the MR2.

When the tunnel between the two mobility routers is established by using the Proxy Mobile Internet Protocol (PMIP), a method is as follows:

When tunnel establishment is initiated by the MR1, the MR1 sends a proxy binding update (Proxy Binding Update) message to the MR2 to instruct the MR2 to establish the tunnel to the MR1, that is, a binding relationship among the IP address of the MN1, the address of the MR1, and tunnel information is established in the MR2. The proxy binding update message may include the address information of the MR1, and in addition, the proxy binding update message may further include port information of the MR1. After receiving the proxy binding update message, the MR2 returns a proxy binding acknowledgment (Proxy Binding Acknowledgement) message to the MR1. Alternatively, when tunnel establishment is initiated by the MR2, the MR2 sends a proxy binding update message to the MR1 to instruct the MR1 to establish the tunnel to the MR2; and after receiving the proxy binding update message, the MR1 returns a proxy binding acknowledgement message to the MR2.

After tunnel establishment is completed, binding lists of the MN1 are generated in both the MR1 and the MR2. For example, in the MR2, the binding list includes the MN IP address, the address of the MR1, and the tunnel information. In the MR1, the binding list includes at least the MN IP, the address of the MR2, and the tunnel information, where the tunnel information may include tunnel port information, and the like.

It should be noted that the MN1 may have multiple home networks, and therefore the MN1 may establish, with H-MRs in the multiple home networks, tunnels used for forwarding data packets. After the tunnel is established, a data packet transmitted between the MN1 and the server may be forwarded by using the established tunnel, to maintain continuity of the session.

Then, if subsequent data is forwarded by using the foregoing tunnel, route redundancy is caused. To avoid route redundancy, a tunnel may be established between the MR1 and the Proxy-MR entity according to this embodiment of the present invention, so that routing is optimized. A process of establishing the tunnel between the MR1 and the Proxy-MR entity is as follows:

614. After the MN1 accesses the mobile IP network by using the MR1, when the MR1 receives a data packet again sent by the MN1, the MR1 may acquire a source IP address (the IP address of the MN1) and a destination IP address (an IP address of a communication peer end) from the data packet.

616. The MR1 sends a Proxy-MR request message to an LM1, where the message includes at least the IP address of the communication peer end.

For an independent LM, each MR is corresponding to one LM, and different LMs have different addresses. In this case, a binding relationship between an address of the Proxy-MR entity and the IP address of the communication peer end (hereinafter referred to as a server IP) is recorded in each LM. Therefore, an MR may request the address of the Proxy-MR entity from an LM corresponding to the MR (the MR statically configures an address of the LM corresponding to the MR).

Alternatively, a binding relationship between an address of the Proxy-MR entity and the server IP may be recorded in a server that may provide a service for multiple MRs. For example, the server may be a centralized database, or may be a domain name server.

618. The LM1 returns a Proxy-MR response message to the MR1, where the message includes at least an address of the Proxy-MR entity.

620. The MR1 initiates, to the Proxy-MR entity based on the address of the Proxy-MR entity, a process of establishing a route optimization tunnel, where the process of establishing the route optimization tunnel is similar to a process of establishing the tunnel in step 612, and details are not described herein again.

When the tunnel between the MR1 and the Proxy-MR entity is established by using the GTP protocol, the MR1 sends a create bearer request message to the Proxy-MR entity, where the create bearer request message is used to instruct the Proxy-MR entity to establish the tunnel to the MR1, and the create bearer request message includes the IP address of the MN1 and the IP address of the communication peer end; and the Proxy-MR entity returns a create bearer response message to the MR1. When the MR1 receives the create bearer response message, the tunnel establishment process ends.

When the tunnel between the MR1 and the Proxy-MR entity is established by using the Proxy Mobile Internet Protocol (PMIP) Protocol, the MR1 sends a proxy binding update message to the Proxy-MR entity, where the proxy binding update message is used to instruct the Proxy-MR entity to establish the tunnel to the MR1, and the proxy binding update message includes the LP address of the MN1 and the IP address of the communication peer end; and the Proxy-MR entity returns a proxy binding acknowledgement message to the MR1. When the MR1 receives the proxy binding acknowledgement message, the tunnel establishment process ends.

In this embodiment, if multiple MNs communicate with corresponding communication peer ends, the foregoing route optimization tunnel may be established for each pair of an MN and a communication peer end, that is, each pair of a source IP and a destination IP (that is, an MN IP and a server IP) is corresponding to one tunnel. Therefore, after tunnel establishment is completed, binding lists are separately generated in the MR1 and the Proxy-MR entity, that is, the binding list generated in the MR1 includes the MN IP, the server IP, the address of the Proxy-MR entity, the tunnel information, and a binding relationship among the MN IP, the server IP, the address of the Proxy-MR entity, and the tunnel information. The binding list generated in the Proxy-MR entity includes the server IP, the MN IP, the address of the MR1, the tunnel information, and a binding relationship among the server IP, the MN EP, the address of the MR1, and the tunnel information. For example, a format of the binding list generated in the MR1 is as follows:

TABLE 1

| Binding list in the MR1 MN IP address | | | |
|---|---|---|
| server IP1 | Address of a Proxy-MR1 | Tunnel information 1 |
| server IP2 | Address of a Proxy-MR1 | Tunnel information 2 |
| server IP3 | Address of a Proxy-MR2 | Tunnel information 3 |
| . . . | . . . | . . . |

The server IP1 and the server IP2 in Table 1 may belong to a same server, or may belong to different servers.

Referring to Table 1, binding relationships of three tunnels are listed. A tunnel corresponding to the tunnel information 1 is used as an example, where a source IP address included in a data packet received by the MR1 is an MN IP1 (that is, the IP address of the MN1), and a destination IP is the server IP1 (that is, the IP address of the communication peer end). After tunnel establishment is completed, all data packets whose source IPs are the MN IP1 and destination IPs are the server IP1 and that are received by the MR1 are transmitted by using the tunnel corresponding to the tunnel information 1.

TABLE 2

| Binding list in the Proxy-MR1 Server IP address | | | |
|---|---|---|
| MN IP1 | Address of an MN C-MR1 | Tunnel information 1 |
| MN IP2 | Address of an MN C-MR2 | Tunnel information 2 |
| MN IP3 | Address of an MN C-MR2 | Tunnel information 3 |

Referring to Table 2, binding relationships of three tunnels are listed. A tunnel corresponding to the tunnel information 1 is used as an example, where a source IP address included in a data packet received by the Proxy-MR1 is an MN IP1, and a destination address is a server IP1 (that is, the IP address of the communication peer end). After tunnel establishment is completed, all data packets whose source IP is the MN IP1 and destination IP is the server IP1 and that is received by the Proxy-MR1 by using a tunnel 1 is forwarded to a communication peer end whose address is the Server IP.

It should be noted that the solution in this embodiment of the present invention is applicable to three LM architectures: (1) a distributed LM architecture, that is, multiple LMs are interconnected, where for an MR, the multiple LMs are an entirety, only one LM address needs to be statically configured, and all MRs share the LM address; (2) a centralized LM architecture, that is, only one LM exists, and same as the distributed LM architecture, only one LM address needs to be statically configured for MRs; (3) an independent LM architecture, that is, multiple LMs may be mutually independent, and one corresponding LM address needs to be allocated to each MR. In the three LM architectures, tunnel establishment methods are the same, and manners for obtaining the address of the Proxy-MR entity are also basically similar, where the address of the Proxy-MR entity is requested from a statically configured LM. For the MN1 and the communication peer end that communicate by using the Proxy-MR entity, a binding relationship between the address of the Proxy-MR entity and the IP address of the communication peer end may be flexibly set in an LM corresponding to the C-MR or on a server (for example, a centralized database or a domain name server) accessible to an MR.

In addition, when receiving the data packet sent by the MN1, the MR1 may firstly search the binding list according to the IP address of the MN1 (that is, the source IP address of the data packet) and the IP address of the communication peer end (that is, the destination IP address of the data packet) in the data packet, to determine whether the tunnel is established between the MR1 and the Proxy-MR entity. If the tunnel is established between the MR1 and the Proxy-MR entity, that is, a binding relationship among the address of the MR1, the IF address of the MN1, the address of the Proxy-MR entity, and the tunnel information exists in the binding list, the data packet is transmitted, according to the tunnel information in the binding list, by using the tunnel corresponding the tunnel information. If no tunnel is established between the MR1 and the Proxy-MR entity, the MR1 determines whether the IP address of the MN1 is allocated by the MR1, and if the IP address of the MN1 is allocated by the MR1, the data packet is directly sent to a destination corresponding to the destination address in the data packet, or if the IP address of the MN1 is not allocated by the MR1, one of the following two methods is performed:

Method 1: The MR1 caches the received data packet, establishes the route optimization tunnel (that is, the tunnel between the MR1 and the Proxy-MR entity) by using steps 616 to 620, and then encapsulates the data packet and forwards the encapsulated data packet to the Proxy-MR entity by using the tunnel.

Method 2: The MR1 encapsulates the received data packet and forwards the encapsulated data packet to the MR2, and the MR2 decapsulates the data packet and sends the data packet to a destination (for example, the communication peer end) corresponding to the destination IP address in the data packet, and establishes the route optimization tunnel by using steps 616 to 620, so that a subsequent data packet is routed by using the route optimization tunnel.

It should be understood that when the MR1 receives the data packet sent by the MN1, the MR1 may firstly determine whether the IP address of the MN1 is allocated by the MR1, and if the IP address of the MN1 is allocated by the MR1, the data packet is directly sent to the destination corresponding to the destination address in the data packet, or if the IP address of the MN1 is not allocated by the MR1, the binding list may be searched according to the IP address of the MN1 (that is, the source IP address of the data packet) and the IP address of the communication peer end (that is, the destination IP address of the data packet) in the data packet, to determine whether the tunnel is established between the MR1 and the Proxy-MR entity. If the tunnel is established between the MR1 and the Proxy-MR entity, that is, the binding relationship among the address of the MR1, the IP address of the MN1, the address of the Proxy-MR entity, and the tunnel information exists in the binding list, the data packet is transmitted, according to the tunnel information in the binding list, by using the tunnel corresponding the tunnel information. If no tunnel is established between the MR1 and the Proxy-MR entity, the foregoing Method 1 or Method 2 is executed.

Optionally, the MR1 may determine, according to the IP address of the communication peer end, a mode for establishing a tunnel to perform route optimization. There are two route optimization modes, where one mode is route optimization between two mobile nodes, and the other mode is route optimization between a mobile node and a fixed node (for example, a fixed node that does not support DMM). When an attribute of the IP address of the communication peer end is an operator (Operator) type, that is, when the IP address of the communication peer end is allocated by an operator, the communication peer end is also a mobile node, and therefore a tunnel may be established between mobility routers separately accessed by two mobile nodes. When an attribute of the IP address of the communication peer end is an OTT (Over The Top) type, that is, when the IP address of the communication peer end is an address of a server in an external PDN network or the Internet, a tunnel may be established between a mobile node and a fixed node, and in this case, steps 616 to 620 are executed.

Figure 7:
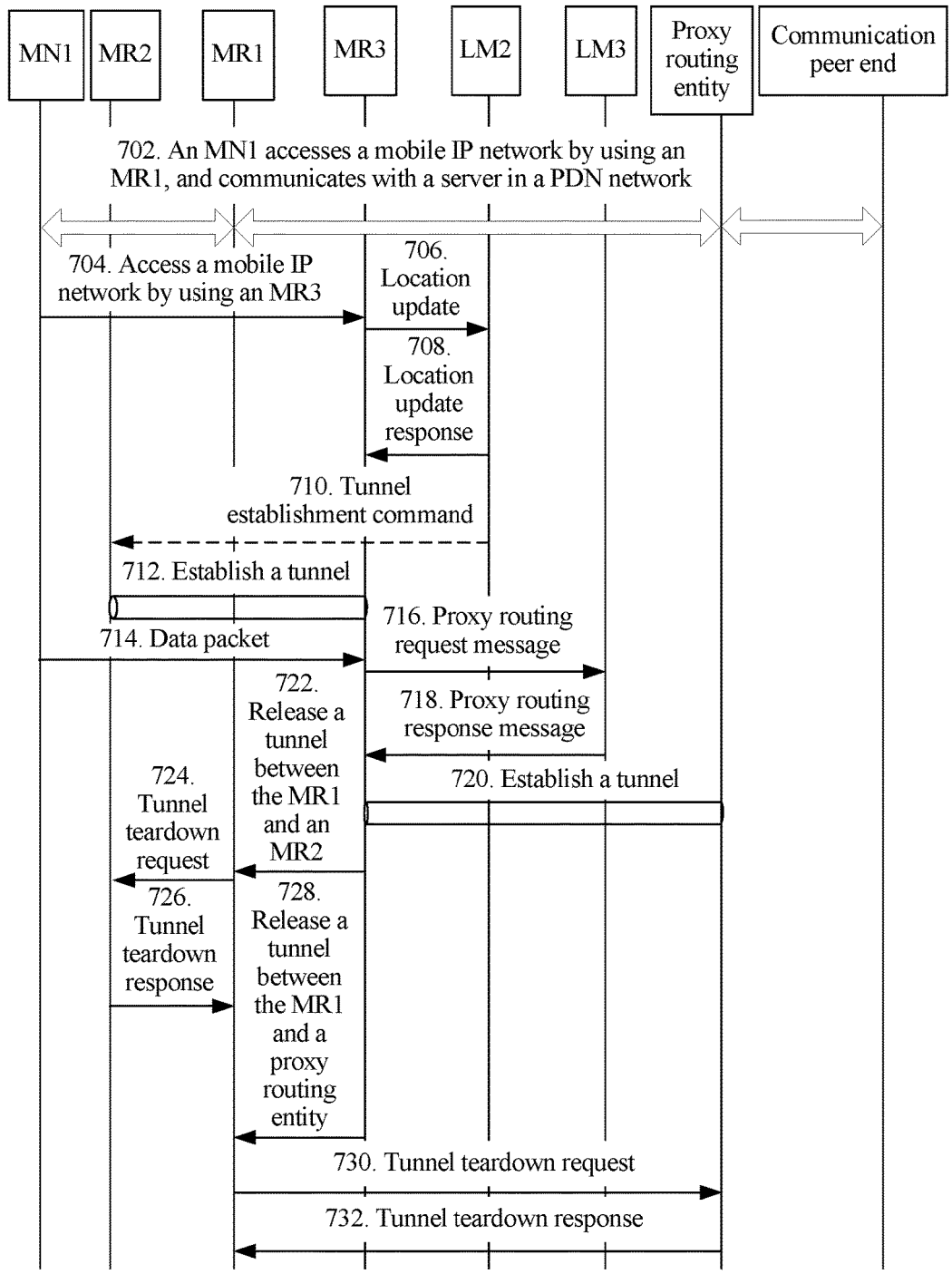
FIG. 7 is a schematic flowchart of a routing process according to another embodiment of the present invention.

FIG. 7 is a schematic flowchart of a routing process according to another embodiment of the present invention.

The embodiment in FIG. 6 describes a process of establishing a route optimization tunnel, and this embodiment describes a process of mobility management performed when an MN moves again. The embodiment in FIG. 7 may be combined with the embodiment in FIG. 6. That is, steps in FIG. 7 may be executed after steps in the embodiment in FIG. 6 are executed.

702. An MN1 accesses a mobile IP network by using an MR1, and communicates with a server in a PDN network.

In the embodiment in FIG. 7, the steps in the embodiment in FIG. 6 are omitted. After the MN1 moves from a network in which the MR1 is located to a network in which an MR3 is located, the following steps may further be executed.

704. The MN1 accesses a mobile IP network by using an MR3.

For example, when the MN1 moves from the mobile network in which the MR1 is located to the mobile network in which the MR3 is located, the MN1 accesses the mobile IP network by using the MR3.

706. The MR3 sends a location update request message to an LM2, to update location information of the MN1 stored in the LM2 to latest location information of the MN1.

708. The LM2 returns a location update response message to the MR3. Step 708 is optional. In a case in which an MR2 initiates tunnel establishment, step 708 may be replaced with the following step 710.

710. The LM2 sends a tunnel establishment command to an MR2.

712. The MR2 establishes a tunnel to the MR3.

A process of establishing the tunnel between the MR2 and the MR3 is similar to a process of establishing the tunnel between the MR1 and the MR2 in the embodiment in FIG. 6, and details are not described herein again.

714. After the MN1 accesses the mobile IP network by using the MR3, when the MR3 receives a data packet again sent by the MN1, the MR3 may acquire a source IP address (an IP address of the MN1) and a destination IP address (an IP address of a communication peer end) from the data packet.

716. The MR3 sends a Proxy-MR request message to an LM1, where the message includes at least the IP address of the communication peer end.

718. The LM1 returns a Proxy-MR response message to the MR3, where the message includes at least an address of a Proxy-MR entity.

720. The MR3 initiates, to the Proxy-MR entity based on the address of the Proxy-MR entity, a process of establishing a route optimization tunnel.

When the tunnel between the MR3 and the Proxy-MR entity is established by using the GTP protocol, the MR3 sends a create bearer request message to the Proxy-MR entity, where the create bearer request message is used to instruct the Proxy-MR entity to establish the tunnel to the MR3, and the create bearer request message includes the IP address of the MN1 and the IP address of the communication peer end, and the Proxy-MR entity returns a create bearer response message to the MR3. When the MR3 receives the create bearer response message, the tunnel establishment process ends.

After establishment of the route optimization tunnel is completed, all data packets whose source IPs are an MN IP and destination IPs are a server LP and that are received by the MR3 are transmitted by using the route optimization tunnel.

722. The MR3 notifies the MR1 to release a tunnel between the MR1 and the MR2, that is, tear down the tunnel between the MR1 and the MR2.

After establishment of the tunnel between the MR2 and the MR3 is completed, the tunnel between the MR1 and the MR2 may be torn down.

724. The MR1 sends a tunnel teardown request message to the MR2.

For example, when the tunnel is established by using GTP, the MR1 sends a delete bearer request (Delete Bearer Request) message to the MR2, where the delete bearer request includes an address of the MR1.

726. The MR2 returns a tunnel teardown response message to the MR1.

For example, the MR2 replies a delete bearer response (Delete Bearer Response) message to the MR1.

In an alternative manner of steps 722 to 726, the MR3 may notify the MR2 to release a tunnel between the MR1 and the MR2. In this case, the MR2 sends a delete bearer request to the MR1, and the MR1 replies a delete bearer response to the MR2.

For example, when the tunnel is established by using PMIP, the MR1 may send a binding revocation indication (Binding Revocation Indication) to the MR2, and the MR2 may replay a binding revocation acknowledgement (Binding Revocation Acknowledgement) to the MR1. Alternatively, the MR2 may send a binding revocation indication to the MR1, and the MR1 may reply a binding revocation acknowledgement to the MR2.

728. The MR3 notifies the MR1 to release a tunnel between the MR1 and the Proxy-MR, that is, tear down the tunnel between the MR1 and the Proxy-MR.

730. The MR1 sends a tunnel teardown request to the Proxy-MR. For example, the MR1 may send a binding revocation indication to the Proxy-MR, where the Binding Revocation Indication includes the address of the MR1.

732. The Proxy-MR replies a tunnel teardown response to the MR1. For example, the Proxy-MR may reply a binding revocation acknowledgement to the MR1.

In an alternative manner of steps 728 to 732, the MR3 may notify the Proxy-MR to release a tunnel between the MR1 and the Proxy-MR. In this case, the Proxy-MR may send a binding revocation indication to the MR1, and the MR1 may reply a binding revocation acknowledgement to the Proxy-MR.

Similarly, LM architectures in the embodiment in FIG. 7 may be three architectures in the embodiment in FIG. 6, and details are not described herein again.

Figure 8:
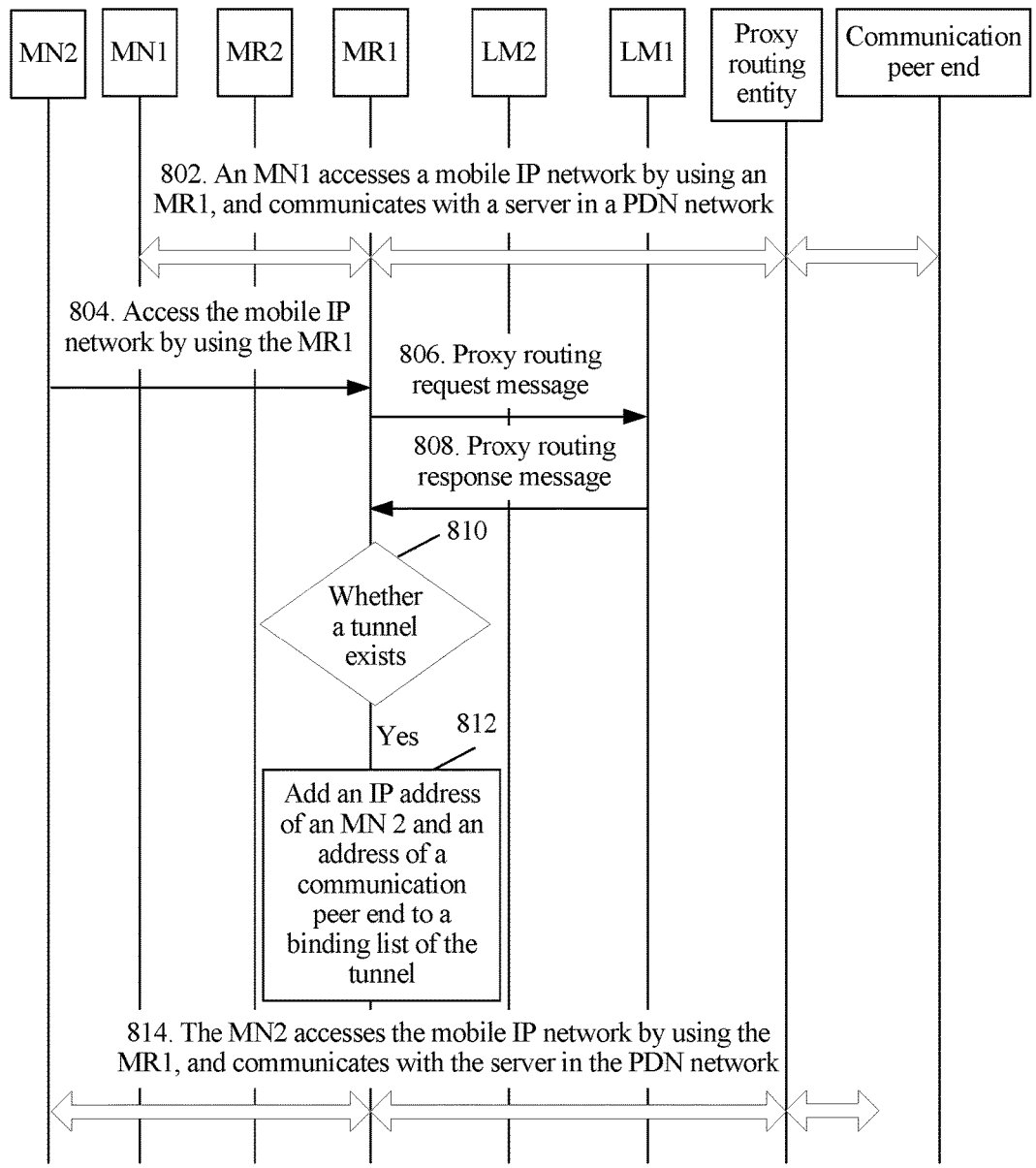
FIG. 8 is a schematic flowchart of a routing process according to another embodiment of the present invention.

FIG. 8 is a schematic flowchart of a routing process according to another embodiment of the present invention.

In the embodiment in FIG. 6, one route optimization tunnel is established for each pair of an MN and a communication peer end, that is, each pair of a source IP/a destination IP is corresponding to one route optimization tunnel. However, in the embodiment in FIG. 8, a route optimization tunnel may be shared by multiple UEs. That is, multiple MNs that perform access by using a same MR communicate with a communication peer end by using a same Proxy-MR, and then these MNs may use a same route optimization tunnel to communicate with the communication peer end.

The embodiment in FIG. 6 describes a process of establishing a route optimization tunnel to a communication peer end by one MN, and this embodiment describes a routing process performed when multiple MNs communicate with a communication peer end by using a same MR. The embodiment in FIG. 8 may be combined with the embodiment in FIG. 6. That is, before the embodiment in FIG. 8 is executed, steps in the embodiment in FIG. 6 may be executed. The following is described by using an example in which another mobile node MN2 communicates with the communication peer end by using an MR1.

804. An MN2 accesses a mobile IP network by using an MR1, and sends a data packet to a communication peer end by using the MR1, the MR1 may acquire a source IP address (an IP address of the MN2) and a destination IP address (an IP address of the communication peer end) from the received data packet.

The MR1 receives the data packet sent by the MN2, and searches a binding list according to an MN IP (that is, the source IP address of the data packet) and a CN IP (that is, the destination IP address of the data packet) in the data packet, to determine whether a tunnel is established between the MR1 and a Proxy-MR entity. If the tunnel is established between the MR1 and the Proxy-MR entity, that is, a binding relationship among an address of the MR1, an IP address of the MN1, an address of the Proxy-MR entity, and tunnel information exists in the binding list, the data packet is transmitted, according to the tunnel information in the binding list, by using the tunnel corresponding the tunnel information. If no tunnel is established between the MR1 and the Proxy-MR entity, the MR1 determines whether an IF address of the MN1 is allocated by the MR1, and if the IP address of the MN1 is allocated by the MR1, the data packet is directly sent to a destination corresponding to the destination address in the data packet, or if the IP address of the MN1 is not allocated by the MR1, one of the following two methods is executed:

Method 1: The MR1 caches the received data packet sent by the MN2, and queries or acquires the address of the Proxy-MR by using the following steps 806 and 808. Then, in the following step 810, the MR1 determines whether a route optimization tunnel for the Proxy-MR exists, and if the route optimization tunnel exists, the MR1 sends, to the Proxy-MR by using the tunnel, the data packet sent by the MN2. If no route optimization tunnel exists, the MR1 establishes the route optimization tunnel, and then encapsulates the data packet sent by the MN2 and forwards the encapsulated data packet to the Proxy-MR by using the tunnel.

Method 2: The MR1 encapsulates the received data packet sent by the MN2 and forwards the encapsulated data packet to the MR2, and the MR2 decapsulates the data packet and sends the data packet to a destination. The MR1 simultaneously queries or acquires the address of the Proxy-MR by using steps 806 and 808.

806. The MR1 sends a Proxy-MR request message to an LM2, where the Proxy-MR request message includes at least the IP address of the communication peer end.

It should be understood that the foregoing embodiment is only an example for illustration, and an architecture of a communications system in this embodiment of the present invention is not limited thereto. For example, the architecture of the communications system may include more or less LMs and MRs, and is not limited to three LMs or three MRs. Multiple LMs may be mutually independent, and are in a one-to-one correspondence with multiple MRs, that is, the multiple LMs are location management entities corresponding to the multiple MRs. One LM address may be configured for each MR. Alternatively, multiple LMs may be distributed, that is, the multiple LMs are interconnected, where the multiple LMs are an entirety, only one LM address needs to be statically configured for multiple MRs, and all the MRs may share the LM address. For another example, a centralized LM may be used, that is, for multiple MRs, only one LM exists, and only one LM address needs to be statically configured for the multiple MRs.

Alternatively, a binding relationship between an address of the Proxy-MR entity and a server IP may be recorded in a server that provides a service for multiple MRs. For example, the server may be a centralized database, or may be a domain name server.

808. An LM1 returns a Proxy-MR response message to the MR1, where the message includes at least an address of a Proxy-MR entity.

810. When receiving the address of the Proxy-MR entity sent by the LM1, the MR1 firstly determines whether a route optimization tunnel between the MR1 and the Proxy-MR exists.

812. If the route optimization tunnel exists, the MR1 adds the source address and the destination address (that is, the IP address of the MN2 and the IP address of the communication peer end) in the data packet to the binding list, the MR1 transmits the data packet by using the route optimization tunnel, and when receiving the data packet, the Proxy-MR adds the MN IP and the server IP in the data packet to the binding list, so that the MN IP and the server IP are used for route optimization of a subsequent data packet.

814. If no route optimization tunnel exists, the MR1 establishes the route optimization tunnel by using a method same as or similar to a method for establishing a route optimization tunnel in FIG. 6, and generates a binding list, where a format of the binding list in the MR1 is as follows:

TABLE 3

| Proxy-MR address | Tunnel information |
|---|---|
| MN IP1 | server IP1 |
| MN IP1 | server IP2 |
| MN IP2 | server IP1 |
| MN IP2 | server IP2 |
| MN IP3 | server IP3 |
| . . . | . . . |

The MN IP1, the MN IP2, and the MN IP3 in Table 3 may belong to a same MN, or may belong to different MNs. These MN IP/server IP addresses share a same Proxy-MR and a same tunnel.

This embodiment is also applied to three LM architectures described in the foregoing embodiment, and details are not described herein again.

For the embodiment in FIG. 8, when the MN1 moves from a network to another network, mobility management may be performed according to the following method.

Because the route optimization tunnel between the MR1 and the Proxy-MR is shared by multiple users, when a binding relationship for other user address information exists in the binding list, the MR1 may delete only a binding list item related to the MN1 in the binding list.

In addition, when a route optimization tunnel between an MR3 and the Proxy-MR exists, a step of establishing a tunnel does not need to be performed. When receiving a data packet of the MN1, the Proxy-MR may add the MN IP/server IP to a binding list of the MR3, and delete the binding list item of the MN1 in the binding list of the MR1.

Figure 9:
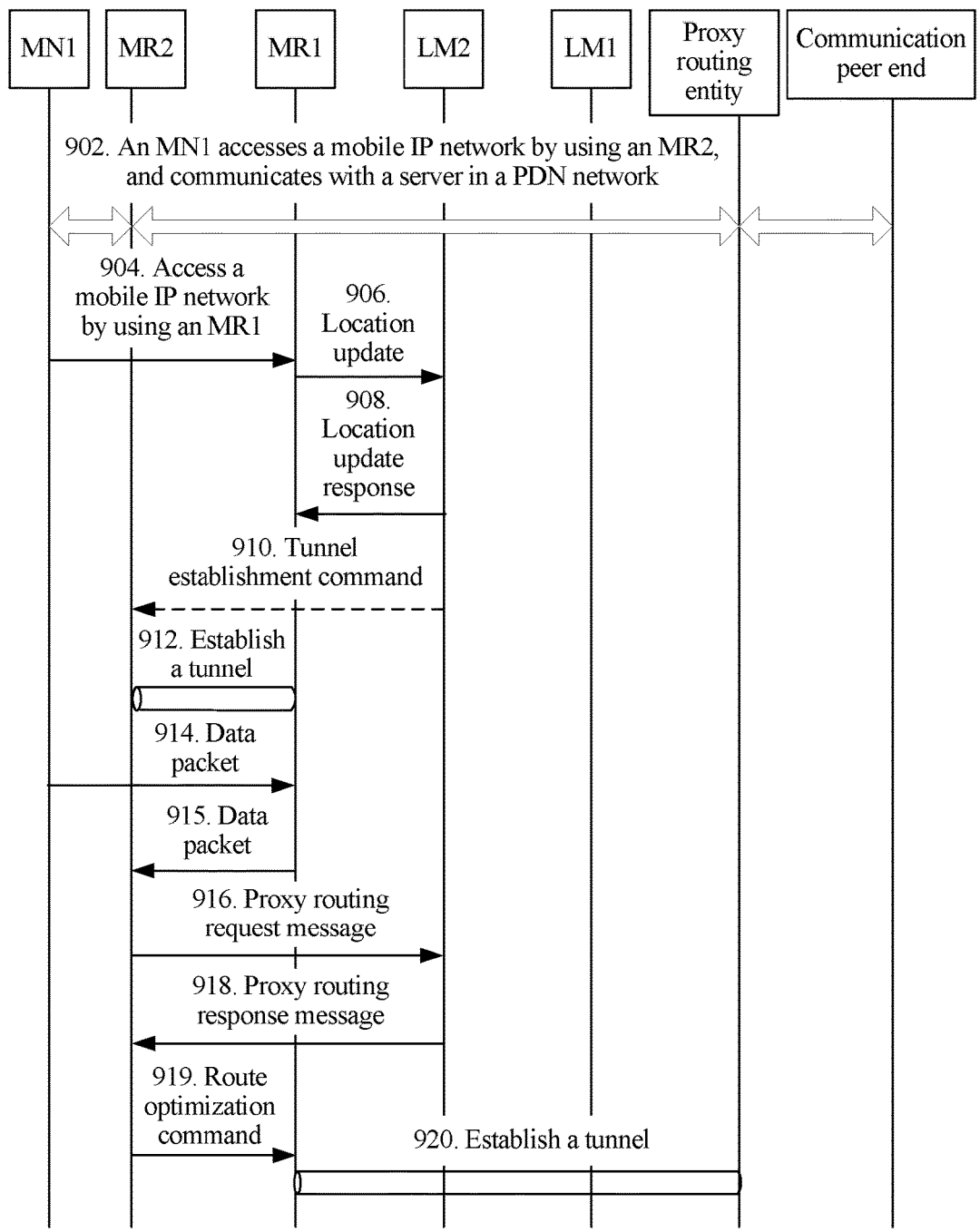
FIG. 9 is a schematic flowchart of a routing process according to an embodiment of the present invention.

FIG. 9 is a schematic flowchart of a routing process according to an embodiment of the present invention. The embodiment in FIG. 6 is an example of the methods in FIG. 2 to FIG. 5. Steps 902 to 912 in the embodiment in FIG. 9 are similar to steps 602 to 612 in the embodiment in FIG. 6, and details are not described herein again.

In this embodiment, referring to FIG. 1, an example in which an MN in a mobile IP network communicates with a communication peer end located in a PDN is used for description.

According to this embodiment of the present invention, a proxy mobile routing (Proxy-MR) entity may be added to a data transmission path between the MN and the communication peer end, and may be disposed on a border MR or a border gateway in the mobile IP network 120, or may be independently disposed in the data transmission path. The Proxy-MR entity has a function of establishing a route optimization tunnel to the MR in the mobile IP network and transmitting a data packet by using the route optimization tunnel. This embodiment of the present invention includes the following content.

902. An MN1 accesses a mobile LP network by using an MR2, and communicates with a server in a PDN network.

904. When the MN1 moves from a network in which the MR2 is located to a network in which an MR1 is located, the MR1 detects access by the MN1, and acquires a valid IP address of the MN1 (that is, an MN IP address).

906. The MR1 sends a location update (Location Update) message to an LM2 in a network in which the MN1 is located, to update location information of the MN1 stored in the LM2 to latest location information of the MN1.

908. After receiving the location update message sent by the MR1, the LM2 records an address of the current router MR1 of the MN1, that is, an address of a C-MR, and returns a location update response message to the MR1.

910. The LM2 sends a tunnel establishment command to the MR2.

912. The MR2 establishes a tunnel to the MR1.

914. After the MN1 accesses the mobile IP network by using the MR1, when the MR1 receives a data packet again sent by the MN1, the MR1 may acquire a source IP address (the IP address of the MN1) and a destination IP address (an IP address of a communication peer end) from the data packet.

915. The MR1 forwards the data packet to the MR2 by using the tunnel.

916. The MR2 sends a Proxy-MR request message to the LM2, where the message includes at least the IP address of the communication peer end, and in addition, the MR2 may send the data packet to the communication peer end.

For an independent LM, each MR is corresponding to one LM, and different LMs have different addresses. In this case, a binding relationship between an address of the Proxy-MR entity and the IP address of the communication peer end (hereinafter referred to as a server IP) is recorded in each LM. Therefore, an MR may request the address of the Proxy-MR entity from an LM corresponding to the MR (the MR statically configures an address of the LM corresponding to the MR).

Alternatively, a binding relationship between an address of the Proxy-MR entity and the server IP may be recorded in a server that may provide a service for multiple MRs. For example, the server may be a centralized database, or may be a domain name server.

918. The LM2 returns a Proxy-MR response message to the MR2, where the message includes at least an address of a Proxy-MR entity.

919. The MR2 sends a route optimization command to the MR1, where the route optimization command includes an address of a proxy routing entity.

920. The MR1 initiates, to the Proxy-MR entity based on the address of the Proxy-MR entity, a process of establishing a route optimization tunnel, where the process of establishing the route optimization tunnel is similar to a process of establishing a tunnel in step 620, and details are not described herein again.

The foregoing describes the routing methods according to the embodiments of the present invention, and the following separately describes a mobility router, a server, and a proxy entity according to the embodiments of the present invention with reference to FIG. 10 to FIG. 17.

Figure 10:
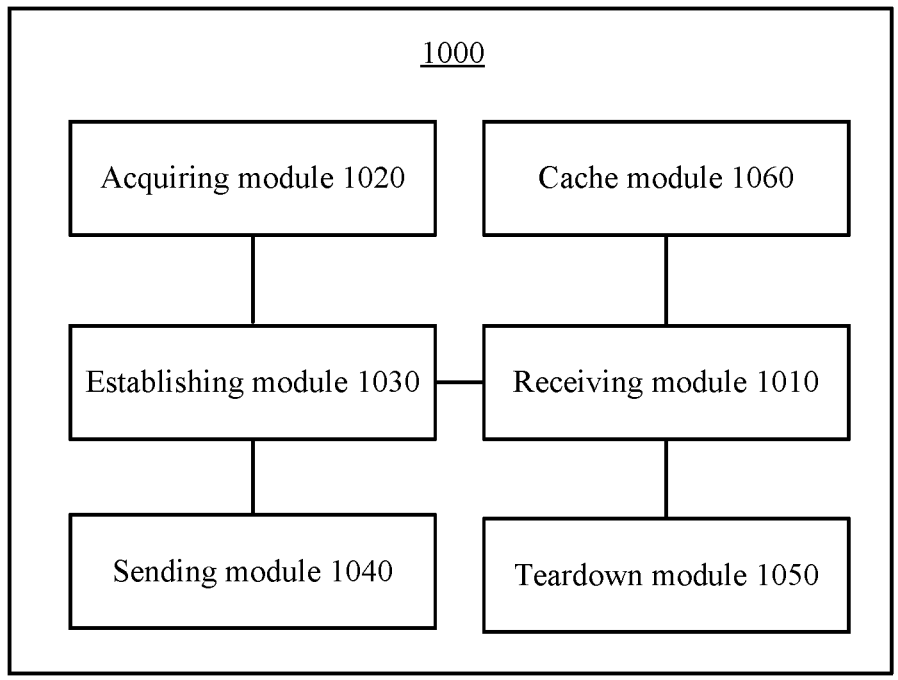
FIG. 10 is a schematic structural diagram of a mobility router according to an embodiment of the present invention.

FIG. 10 is a schematic structural diagram of a mobility router 1000 according to an embodiment of the present invention. The mobility router 1000 includes: a receiving module 1010, an acquiring module 1020, an establishing module 1030, and a sending module 1040.

The receiving module 1010 receives a first data packet sent by a first mobile node to a first communication peer end, where the mobility router is a mobility router in a visited network of the first mobile node, and the first data packet includes an address of the first communication peer end. The acquiring module 1020 acquires an address of a proxy routing entity based on the address of the first communication peer end, where the proxy routing entity is located in a communication path between the mobility router and the first communication peer end. The establishing module 1030 establishes a first tunnel to the proxy routing entity based on the address of the proxy routing entity. The sending module 1040 transmits, by using the first tunnel, a data packet sent by the first communication peer end to the first mobile node.

According to this embodiment of the present invention, when a mobile node moves to a visited network, a mobility router in the visited network establishes a tunnel to a proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

Optionally, in another embodiment, the establishing module 1030 is further configured to establish a second tunnel to a second mobility router before the first mobility router establishes the first tunnel to the proxy routing entity based on the address of the proxy routing entity, where the second mobility router is a mobility router in a home network of the first mobile node; and the sending module 1040 is further configured to: before establishment of the first tunnel is completed, transmit the first data packet between the first mobile node and the first communication peer end by using the second tunnel, and transmit, by using the first tunnel, a subsequent data packet that follows the first data packet and is sent by the first communication peer end to the first mobile node.

Optionally, in another embodiment, the mobility router 1000 further includes: a teardown module 1050, configured to tear down the first tunnel and the second tunnel when determining that the first mobile node communicates with the first communication peer end by using a third tunnel between a third mobility router and the proxy routing entity and a fourth tunnel between the third mobility router and the second mobility router.

Optionally, in another embodiment, the mobility router 1000 further includes: a cache module 1060, configured to: cache the first data packet before establishment of the first tunnel is completed; and/or forward, by using the first tunnel, the cached first data packet to the first communication peer end after establishment of the first tunnel is completed.

According to this embodiment of the present invention, the acquiring module 1020 acquires the address of the proxy routing entity from a server based on the address of the first communication peer end, where a binding relationship between the address of the proxy routing entity and the address of the first communication peer end is set on the server.

According to this embodiment of the present invention, the acquiring module 1020 sends a request message that includes the address of the first communication peer end to a location management entity or a centralized server, and receives a response message that includes the address of the proxy routing entity and is returned by the location management entity or the centralized server.

According to this embodiment of the present invention, the acquiring module 1020 sends a request message that includes the address of the first communication peer end to a domain name server, to acquire the address of the proxy routing entity; receives a response message that includes a domain name corresponding to the address of the first communication peer end and is returned by the domain name server; sends a request message that includes the domain name corresponding to the address of the first communication peer end to the domain name server; and receives a response message that includes the address of the proxy routing entity and is returned by the domain name server.

According to this embodiment of the present invention, the acquiring module 1020 receives a route optimization command sent by the second mobility router, where the route optimization command includes the address of the proxy routing entity and is used to instruct the mobility router to establish the first tunnel to the proxy routing entity; and acquires the address of the proxy routing entity from the route optimization command.

According to this embodiment of the present invention, the establishing module 1030 establishes a binding relationship among the address of the first communication peer end, the address of the proxy routing entity, an address of the first mobile node, and tunnel information of the first tunnel; and sends a tunnel establishment request message to the proxy routing entity, where the tunnel establishment request message includes an address of the mobility router, the address of the first communication peer end, and the address of the first mobile node, so that a binding relationship among the address of the mobility router, the address of the first communication peer end, the address of the first mobile node, and the tunnel information of the first tunnel is established in the proxy routing entity.

According to this embodiment of the present invention, the receiving module 1010 further receives a second data packet sent by a second mobile node to a second communication peer end, where the second data packet includes an address of the second communication peer end; the acquiring module 1020 further acquires the address of the proxy routing entity based on the address of the second communication peer end; in a case in which the establishing module 1030 determines, according to the address of the proxy routing entity, that the first tunnel is established, the establishing module 1030 further establishes a binding relationship among the address of the second communication peer end, the address of the proxy routing entity, an address of the second mobile node, and the tunnel information of the first tunnel; and the sending module 1040 further forwards the second data packet by using the first tunnel, where the second data packet includes the address of the second communication peer end, the address of the mobility router, and the address of the second mobile node, so that a binding relationship among the address of the second communication peer end, the address of the mobility router, the address of the second mobile node, and the tunnel information of the first tunnel is established in the proxy routing entity.

According to this embodiment of the present invention, the first mobile node is located in a mobile network, the first communication peer end is located in a fixed network, the proxy routing entity is configured to connect the mobile network and the fixed network, and the acquiring module 1020 acquires the address of the proxy routing entity when determining that the address of the first communication peer end belongs to an address allocated by the fixed network.

For operations and functions of the units of the mobility router 1000, reference may be made to the embodiment in FIG. 2. To avoid repetition, details are not described herein again.

Figure 11:
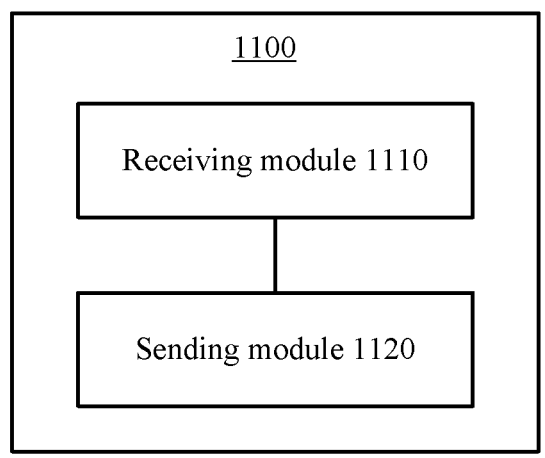
FIG. 11 is a schematic structural diagram of a server according to an embodiment of the present invention.

FIG. 11 is a schematic structural diagram of a server 1100 according to an embodiment of the present invention. The server 1100 includes: a receiving module 1110 and a sending module 1120.

The receiving module 1110 is configured to receive a request message sent by a first mobility router or a second mobility router, where the request message is used to acquire an address of a proxy routing entity, the request message includes an address of a first communication peer end of a first mobile node, a binding relationship between the address of the proxy routing entity and the address of the first communication peer end is set on the server, the proxy routing entity is located in a communication path between the first mobility router and the first communication peer end, the first mobility router is a mobility router in a visited network of the first mobile node, and the second mobility router is a mobility router in a home network of the first mobile node. The sending module 1120 is configured to send a response message, where the response message includes the address of the proxy routing entity.

According to this embodiment of the present invention, when a mobile node moves to a visited network, a first mobility router or a second mobility router may acquire an address of a proxy routing entity from a server, and establish a tunnel between the first mobility router and the proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

According to this embodiment of the present invention, the server 1100 is a location management entity or a centralized server, and the sending module 1120 is further configured to send the response message to the first mobility router or the second mobility router.

According to this embodiment of the present invention, the server 1100 is a domain name server, and the sending module 1120 sends a response message that includes a domain name corresponding to the address of the first communication peer end to the first mobility router or the second mobility router; the receiving module 1110 is further configured to receive a request message that includes the domain name corresponding to the address of the first communication peer end and is sent by the first mobility router or the second mobility router; and the sending module 1120 is further configured to send a response message that includes the address of the proxy routing entity to the first mobility router or the second mobility router.

For operations and functions of the units of the server 1100, reference may be made to the embodiment in FIG. 3. To avoid repetition, details are not described herein again.

Figure 12:
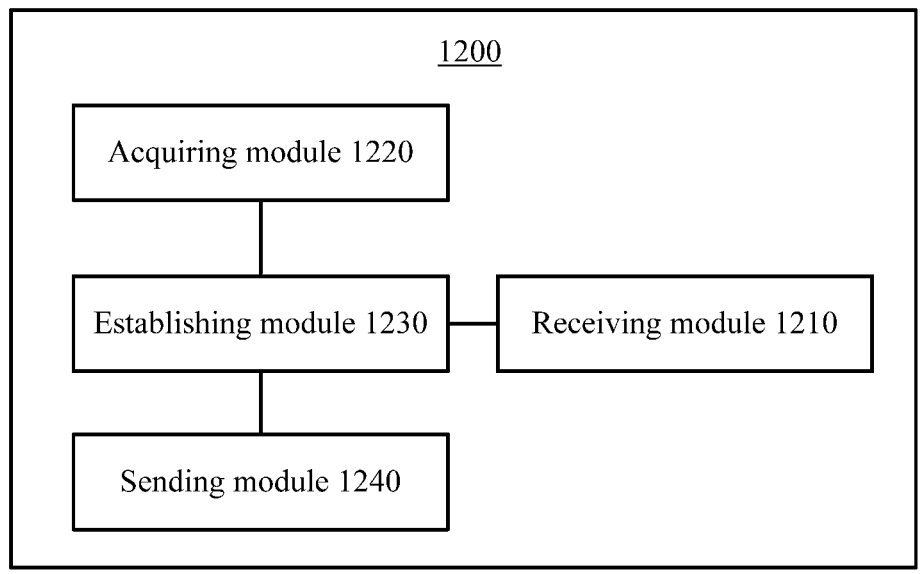
FIG. 12 is a schematic structural diagram of a mobility router according to an embodiment of the present invention.

FIG. 12 is a schematic structural diagram of a mobility router 1200 according to an embodiment of the present invention. The mobility router 1200 includes: a receiving module 1210, an acquiring module 1220, an establishing module 1230, and a sending module 1240.

The establishing module 1230 establishes a second tunnel to a first mobility router, where the mobility router 1200 is a mobility router in a home network of a first mobile node, and the first mobility router is a mobility router in a visited network of the first mobile node. The receiving module 1210 receives, by using the second tunnel, a first data packet that is forwarded by the first mobility router and is transmitted between the first mobile node and a first communication peer end, where the first data packet includes an address of the first communication peer end. The acquiring module 1220 acquires an address of a proxy routing entity based on the address of the first communication peer end, where the proxy routing entity is located in a communication path between the first mobility router and the first communication peer end. The sending module 1240 sends a route optimization command to the first mobility router, where the route optimization command includes the address of the proxy routing entity and is used to instruct the first mobility router to establish a first tunnel to the proxy routing entity.

According to this embodiment of the present invention, when a mobile node moves to a visited network, a mobility router in the visited network may firstly establish a tunnel to a second mobility router, and the second mobility router instructs the first mobility router to establish a tunnel to a proxy routing entity, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

According to this embodiment of the present invention, the acquiring module 1220 acquires the address of the proxy routing entity from a server based on the address of the first communication peer end, where a binding relationship between the address of the proxy routing entity and the address of the first communication peer end is set on the server.

According to this embodiment of the present invention, the acquiring module 1220 sends a request message that includes the address of the first communication peer end to a location management entity or a centralized server, and receives a response message that includes the address of the proxy routing entity and is returned by the location management entity or the centralized server.

According to this embodiment of the present invention, the acquiring module 1220 sends a request message that includes the address of the first communication peer end to a domain name server, to acquire the address of the proxy routing entity, receives a response message that includes a domain name corresponding to the address of the first communication peer end and is sent by the domain name server, sends a request message that includes the domain name corresponding to the address of the first communication peer end to the domain name server, and receives a response message that includes the address of the proxy routing entity and is sent by the domain name server.

For operations and functions of the units of the mobility router 1200, reference may be made to the embodiment in FIG. 4. To avoid repetition, details are not described herein again.

Figure 13:
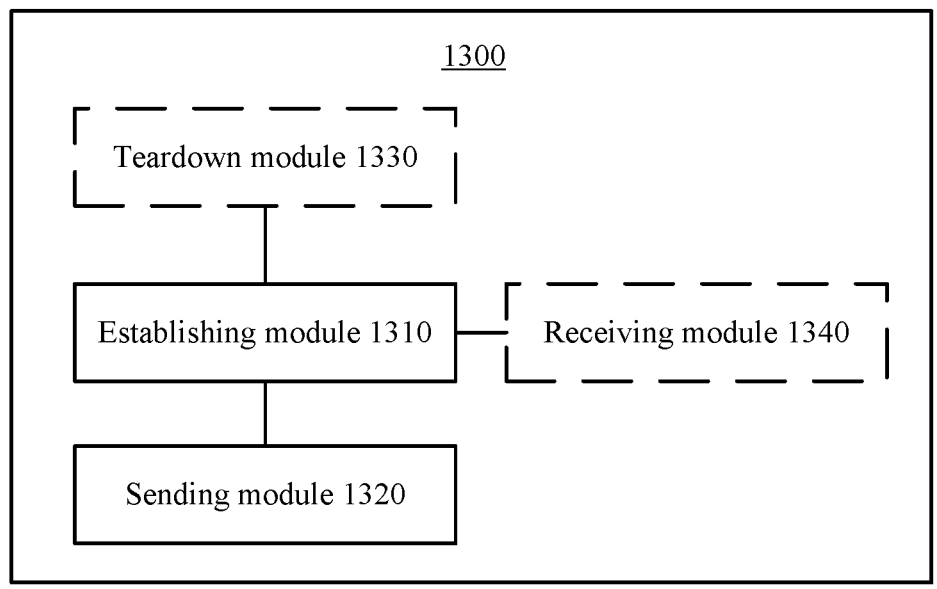
FIG. 13 is a schematic structural diagram of a proxy routing entity according to an embodiment of the present invention.

FIG. 13 is a schematic structural diagram of a proxy routing entity 1300 according to an embodiment of the present invention. The proxy routing entity 1300 includes: an establishing module 1310 and a sending module 1320.

The establishing module 1310 is configured to establish a first tunnel to a first mobility router, where the proxy routing entity is located in a communication path between the first mobility router and a first communication peer end of a first mobile node, and the first mobility router is a mobility router in a visited network of the first mobile node. The sending module 1320 is configured to transmit a data packet between the first mobile node and the first communication peer end by using the first tunnel according to a binding relationship.

According to this embodiment of the present invention, when a mobile node moves to a visited network, a mobility router in the visited network may establish a tunnel to a proxy router, so that the mobile node can transmit a data packet to a communication peer end by using the tunnel. Because the proxy routing entity is disposed between the mobility router and the communication peer end, using a mobility router in a home network to forward the data packet to the communication peer end can be avoided, thereby resolving a route redundancy problem.

According to this embodiment of the present invention, the establishing module 1310 receives a tunnel establishment request message sent by the first mobility router, where the tunnel establishment request message includes an address of the first mobile node, an address of the first communication peer end, and an address of the first mobility router; and establishes a binding relationship among the address of the first mobility router, the address of the first communication peer end, the address of the first mobile node, and tunnel information of the first tunnel.

Optionally, in another embodiment, the proxy routing entity 1300 further includes: a teardown module 1330, where the establishing module 1310 further establishes a third tunnel to a third mobility router, and the teardown module 1330 tears down the first tunnel after the third tunnel is established.

Optionally, in another embodiment, the proxy routing entity 1300 further includes: a receiving module 1340, configured to receive a second data packet that is forwarded by the first mobile node by using a second tunnel and is transmitted between a second mobile node and a second communication peer end, where the second data packet includes an address of the second mobile node, an address of the second communication peer end, and the address of the first mobility router; where the establishing module 1310 is configured to establish a binding relationship among the address of the first mobility router, the address of the second mobile node, the address of the second communication peer end, and the tunnel information of the first tunnel.

According to this embodiment of the present invention, the first mobile node is located in a mobile network, the first communication peer end is located in a fixed network, and the proxy routing entity is configured to connect the mobile network and the fixed network.

For operations and functions of the units of the proxy routing entity 1300, reference may be made to the embodiment in FIG. 5. To avoid repetition, details are not described herein again.

Figure 14:
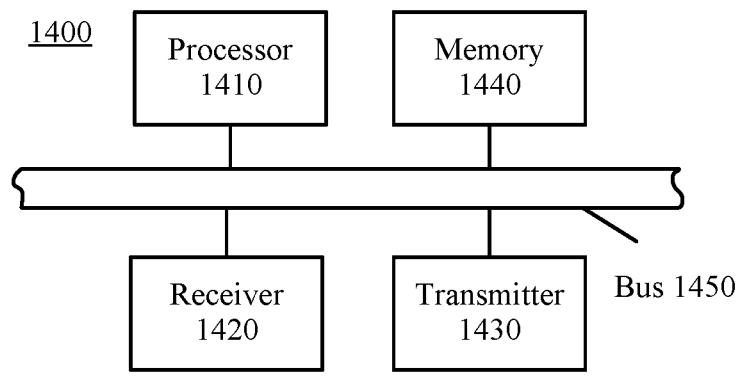
FIG. 14 is a schematic structural diagram of a mobility router according to an embodiment of the present invention.

FIG. 14 is a schematic structural diagram of a mobility router 1400 according to an embodiment of the present invention. The mobility router 1400 includes: a processor 1410, a receiver 1420, a transmitter 1430, a memory 1440, and a bus 1450.

The receiver 1420 receives a first data packet sent by a first mobile node to a first communication peer end, where the mobility router 1400 is a mobility router in a visited network of the first mobile node, and the first data packet includes an address of the first communication peer end. The processor 1410 invokes, by using the bus, code stored in the memory 1440, to acquire an address of a proxy routing entity based on the address of the first communication peer end, where the proxy routing entity is located in a communication path between the mobility router and the first communication peer end. The processor 1410 further establishes a first tunnel to the proxy routing entity based on the address of the proxy routing entity. The transmitter 1430 transmits, by using the first tunnel, a data packet sent by the first communication peer end to the first mobile node.

Optionally, in another embodiment, the processor 1410 is further configured to establish a second tunnel to a second mobility router before the first mobility router establishes the first tunnel to the proxy routing entity based on the address of the proxy routing entity, where the second mobility router is a mobility router in a home network of the first mobile node; and the transmitter 1430 is further configured to: before establishment of the first tunnel is completed, transmit the first data packet between the first mobile node and the first communication peer end by using the second tunnel, and transmit, by using the first tunnel, a subsequent data packet that follows the first data packet and is sent by the first communication peer end to the first mobile node.

Optionally, in another embodiment, the processor 1410 further tears down the first tunnel and the second tunnel when determining that the first mobile node communicates with the first communication peer end by using a third tunnel between a third mobility router and the proxy routing entity and a fourth tunnel between the third mobility router and the second mobility router.

Optionally, in another embodiment, the processor 1410 caches the first data packet before establishment of the first tunnel is completed; and/or the transmitter 1430 further forwards, by using the first tunnel, the cached first data packet to the first communication peer end after establishment of the first tunnel is completed.

According to this embodiment of the present invention, the processor 1410 acquires the address of the proxy routing entity from a server based on the address of the first communication peer end, where a binding relationship between the address of the proxy routing entity and the address of the first communication peer end is set on the server.

According to this embodiment of the present invention, the processor 1410 controls the transmitter 1430 to send a request message that includes the address of the first communication peer end to a location management entity or a centralized server, and controls the receiver 1420 to receive a response message that includes the address of the proxy routing entity and is returned by the location management entity or the centralized server.

According to this embodiment of the present invention, the processor 1410 controls the transmitter 1430 to send a request message that includes the address of the first communication peer end to a domain name server, to acquire the address of the proxy routing entity; controls the receiver 1420 to receive a response message that includes a domain name corresponding to the address of the first communication peer end and is returned by the domain name server; controls the transmitter 1430 to send a request message that includes the domain name corresponding to the address of the first communication peer end to the domain name server; and controls the receiver 1420 to receive a response message that includes the address of the proxy routing entity and is returned by the domain name server.

According to this embodiment of the present invention, the processor 1410 controls the receiver 1420 to: receive a route optimization command sent by the second mobility router, where the route optimization command includes the address of the proxy routing entity and is used to instruct the mobility router to establish the first tunnel to the proxy routing entity; and acquire the address of the proxy routing entity from the route optimization command.

According to this embodiment of the present invention, the processor 1410 establishes a binding relationship among the address of the first communication peer end, the address of the proxy routing entity, an address of the first mobile node, and tunnel information of the first tunnel; and sends a tunnel establishment request message to the proxy routing entity, where the tunnel establishment request message includes an address of the mobility router, the address of the first communication peer end, and the address of the first mobile node, so that a binding relationship among the address of the mobility router, the address of the first communication peer end, the address of the first mobile node, and the tunnel information of the first tunnel is established in the proxy routing entity.

According to this embodiment of the present invention, the receiver 1420 further receives a second data packet sent by a second mobile node to a second communication peer end, where the second data packet includes an address of the second communication peer end; the processor 1410 further acquires the address of the proxy routing entity based on the address of the second communication peer end; in a case in which the processor 1410 determines, according to the address of the proxy routing entity, that the first tunnel is established, the processor 1410 further establishes a binding relationship among the address of the second communication peer end, the address of the proxy routing entity, an address of the second mobile node, and the tunnel information of the first tunnel; and the transmitter 1430 further forwards the second data packet by using the first tunnel, where the second data packet includes the address of the second communication peer end, the address of the mobility router, and the address of the second mobile node, so that a binding relationship among the address of the second communication peer end, the address of the mobility router, the address of the second mobile node, and the tunnel information of the first tunnel is established in the proxy routing entity.

According to this embodiment of the present invention, the first mobile node is located in a mobile network, the first communication peer end is located in a fixed network, the proxy routing entity is configured to connect the mobile network and the fixed network, and the processor 1410 acquires the address of the proxy routing entity when determining that the address of the first communication peer end belongs to an address allocated by the fixed network.

For operations and functions of the units of the mobility router 1400, reference may be made to the embodiment in FIG. 2. To avoid repetition, details are not described herein again.

Figure 15:
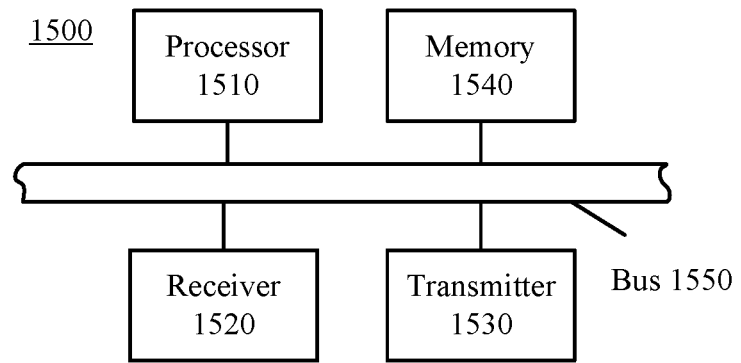
FIG. 15 is a schematic structural diagram of a server according to an embodiment of the present invention.

FIG. 15 is a schematic structural diagram of a server 1500 according to an embodiment of the present invention. The server 1500 includes: a processor 1510, a receiver 1520, a transmitter 1530, a memory 1540, and a bus 1550.

The processor 1510 controls, by using the bus, the receiver 1520 to receive a request message sent by a first mobility router or a second mobility router, where the request message is used to acquire an address of a proxy routing entity, the request message includes an address of a first communication peer end of a first mobile node, a binding relationship between the address of the proxy routing entity and the address of the first communication peer end is set on the server, the proxy routing entity is located in a communication path between the first mobility router and the first communication peer end, the first mobility router is a mobility router in a visited network of the first mobile node, and the second mobility router is a mobility router in a home network of the first mobile node. The processor 1510 controls, by using the bus, the transmitter 1530 to send a response message, where the response message includes the address of the proxy routing entity.

According to this embodiment of the present invention, the server 1500 is a location management entity or a centralized server, and the transmitter 1530 is further configured to send the response message to the first mobility router or the second mobility router.

According to this embodiment of the present invention, the server 1500 is a domain name server, and the transmitter 1530 sends a response message that includes a domain name corresponding to the address of the first communication peer end to the first mobility router or the second mobility router; the receiver 1520 receives a request message that includes the domain name corresponding to the address of the first communication peer end and is sent by the first mobility router or the second mobility router; and the transmitter 1530 is further configured to send a response message that includes the address of the proxy routing entity to the first mobility router or the second mobility router.

For operations and functions of the units of the server 1500, reference may be made to the embodiment in FIG. 3. To avoid repetition, details are not described herein again.

Figure 16:
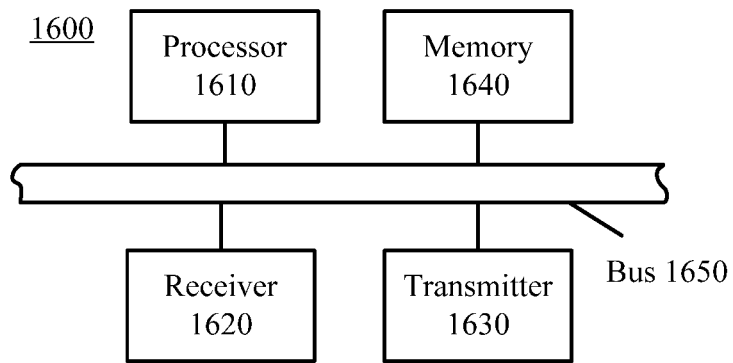
FIG. 16 is a schematic structural diagram of a mobility router according to an embodiment of the present invention.

FIG. 16 is a schematic structural diagram of a mobility router 1600 according to an embodiment of the present invention. The mobility router 1600 includes: a processor 1610, a receiver 1620, a transmitter 1630, a memory 1640, and a bus 1650.

The processor 1610 invokes, by using the bus 1650, code stored in the memory 1640, to establish a second tunnel to a first mobility router, where the mobility router 1600 is a mobility router in a home network of a first mobile node, and the first mobility router is a mobility router in a visited network of the first mobile node. The receiver 1620 receives, by using the second tunnel, a first data packet that is forwarded by the first mobility router and is transmitted between the first mobile node and a first communication peer end, where the first data packet includes an address of the first communication peer end. The processor 1610 acquires an address of a proxy routing entity based on the address of the first communication peer end, where the proxy routing entity is located in a communication path between the first mobility router and the first communication peer end. The transmitter 1630 sends a route optimization command to the first mobility router, where the route optimization command includes the address of the proxy routing entity and is used to instruct the first mobility router to establish a first tunnel to the proxy routing entity.

According to this embodiment of the present invention, the processor 1610 acquires the address of the proxy routing entity from a server based on the address of the first communication peer end, where a binding relationship between the address of the proxy routing entity and the address of the first communication peer end is set on the server.

According to this embodiment of the present invention, the processor 1610 controls the transmitter 1630 to send a request message that includes the address of the first communication peer end to a location management entity or a centralized server, and controls the receiver 1620 to receive a response message that includes the address of the proxy routing entity and is returned by the location management entity or the centralized server.

According to this embodiment of the present invention, the processor 1610 controls the transmitter 1630 to send a request message that includes the address of the first communication peer end to a domain name server, to acquire the address of the proxy routing entity; controls the receiver 1620 to receive a response message that includes a domain name corresponding to the address of the first communication peer end and is sent by the domain name server; controls the transmitter 1630 to send a request message that includes the domain name corresponding to the address of the first communication peer end to the domain name server; and controls the receiver 1620 to receive a response message that includes the address of the proxy routing entity and is sent by the domain name server.

For operations and functions of the units of the mobility router 1600, reference may be made to the embodiment in FIG. 4. To avoid repetition, details are not described herein again.

Figure 17:
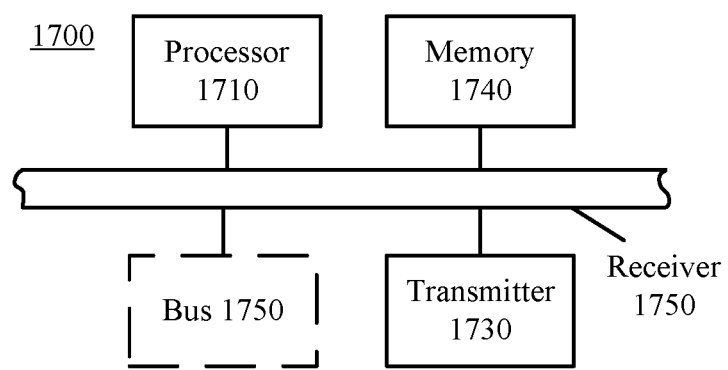
FIG. 17 is a schematic structural diagram of a proxy routing entity according to an embodiment of the present invention.

FIG. 17 is a schematic structural diagram of a proxy routing entity 1700 according to an embodiment of the present invention. The proxy routing entity 1700 includes: a processor 1710, a transmitter 1720, a memory 1730, and a bus 1740.

The processor 1710 invokes, by using the bus 1740, code stored in the memory 1730, to establish a first tunnel to a first mobility router, where the proxy routing entity is located in a communication path between the first mobility router and a first communication peer end of a first mobile node, and the first mobility router is a mobility router in a visited network of the first mobile node. The transmitter 1720 is configured to transmit a data packet between the first mobile node and the first communication peer end by using the first tunnel according to a binding relationship.

According to this embodiment of the present invention, the proxy routing entity 1700 further includes a receiver 1750, where the processor 1710 controls the receiver 1750 to receive a tunnel establishment request message sent by the first mobility router, where the tunnel establishment request message includes an address of the first mobile node, an address of the first communication peer end, and an address of the first mobility router; and establish a binding relationship among the address of the first mobility router, the address of the first communication peer end, the address of the first mobile node, and tunnel information of the first tunnel.

Optionally, in another embodiment, the processor 1710 further establishes a third tunnel to a third mobility router, and tears down the first tunnel after the third tunnel is established.

Optionally, in another embodiment, the proxy routing entity 1700 further includes: a receiver 1750, configured to receive a second data packet that is forwarded by the first mobile node by using a second tunnel and is transmitted between a second mobile node and a second communication peer end, where the second data packet includes an address of the second mobile node, an address of the second communication peer end, and the address of the first mobility router; where the processor establishes a binding relationship among the address of the first mobility router, the address of the second mobile node, the address of the second communication peer end, and the tunnel information of the first tunnel.

According to this embodiment of the present invention, the first mobile node is located in a mobile network, the first communication peer end is located in a fixed network, and the proxy routing entity 1700 is configured to connect the mobile network and the fixed network.

For operations and functions of the units of the proxy routing entity 1700, reference may be made to the embodiment in FIG. 5. To avoid repetition, details are not described herein again.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of the present invention essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a Read-Only Memory (ROM), a Random Access Memory (RAM), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A routing method, comprising:
    receiving, by a first mobility router, a first data packet sent by a first mobile node to a first communication peer end, wherein the first mobility router is a mobility router in a visited network of the first mobile node, and the first data packet comprises an address of the first communication peer end;
    acquiring, by the first mobility router, an address of a proxy routing entity based on the address of the first communication peer end, wherein the proxy routing entity is located in a communication path between the first mobility router and the first communication peer end;
    establishing, by the first mobility router, a second tunnel to a second mobility router, wherein the second mobility router is a mobility router in a home network of the first mobile node;
    establishing, by the first mobility router, a first tunnel to the proxy routing entity based on the address of the proxy routing entity;
    before completing establishment of the first tunnel, transmitting, by the first mobility router, the first data packet between the first mobile node and the first communication peer end by using the second tunnel; and
    transmitting, by the first mobility router by using the first tunnel, a subsequent data packet that follows the first data packet and is sent by the first communication peer end to the first mobile node.

2. The routing method according to claim 1, further comprising:
    tearing down, by the first mobility router, the first tunnel and the second tunnel when determining that the first mobile node communicates with the first communication peer end by using a third tunnel between a third mobility router and the proxy routing entity and a fourth tunnel between the third mobility router and the second mobility router.

3. The routing method according to claim 1, wherein the acquiring, by the first mobility router, an address of a proxy routing entity based on the address of the first communication peer end comprises:
    receiving, by the first mobility router, a route optimization command sent by the second mobility router, wherein the route optimization command comprises the address of the proxy routing entity and is used to instruct the first mobility router to establish the first tunnel to the proxy routing entity; and
    acquiring, by the first mobility router, the address of the proxy routing entity from the route optimization command.

4. The routing method according to claim 1, further comprising:
    caching, by the first mobility router, the first data packet before completing establishment of the first tunnel; and/or
    forwarding, by the first mobility router by using the first tunnel, the cached first data packet to the first communication peer end after completing establishment of the first tunnel.

5. The routing method according to claim 1, wherein the acquiring, by the first mobility router, an address of a proxy routing entity based on the address of the first communication peer end comprises:
    acquiring, by the first mobility router, the address of the proxy routing entity from a server based on the address of the first communication peer end, wherein a binding relationship between the address of the proxy routing entity and the address of the first communication peer end is set on the server.

6. The routing method according to claim 5, wherein the server is a location management entity or a centralized server, and the acquiring, by the first mobility router, the address of the proxy routing entity from a server based on the address of the first communication peer end comprises:
    sending, by the first mobility router, a request message that comprises the address of the first communication peer end to the location management entity or the centralized server; and
    receiving, by the first mobility router, a response message that comprises the address of the proxy routing entity and is returned by the location management entity or the centralized server.

7. The routing method according to claim 5, wherein the server is a domain name server, and the acquiring, by the first mobility router, an address of a proxy routing entity based on the address of the first communication peer end comprises:
    sending, by the first mobility router, a request message that comprises the address of the first communication peer end to the domain name server, to acquire the address of the proxy routing entity;
    receiving, by the first mobility router, a response message that comprises a domain name corresponding to the address of the first communication peer end and is returned by the domain name server;

sending, by the first mobility router, a request message that comprises the domain name corresponding to the address of the first communication peer end to the domain name server; and receiving, by the first mobility router, a response message that comprises the address of the proxy routing entity and is returned by the domain name server.

8. The routing method according to claim 1, wherein the establishing, by the first mobility router, a first tunnel to the proxy routing entity based on the address of the proxy routing entity comprises:

establishing, by the first mobility router, a binding relationship among the address of the first communication peer end, the address of the proxy routing entity, an address of the first mobile node, and tunnel information of the first tunnel; and sending, by the first mobility router, a tunnel establishment request message to the proxy routing entity, wherein the tunnel establishment request message comprises an address of the first mobility router, the address of the first communication peer end, and the address of the first mobile node, so that a binding relationship among the address of the first mobility router, the address of the first communication peer end, the address of the first mobile node, and the tunnel information of the first tunnel is established in the proxy routing entity.

9. The routing method according to claim 8, wherein the first mobility router is a mobility router in the visited network of a second mobile node, and the routing method further comprises:

receiving, by the first mobility router, a second data packet sent by the second mobile node to a second communication peer end, wherein the second data packet comprises an address of the second communication peer end;

acquiring, by the first mobility router, the address of the proxy routing entity based on the address of the second communication peer end;

in a case in which the first mobility router determines, according to the address of the proxy routing entity, that the first tunnel is established, establishing, by the first mobility router, a binding relationship among the address of the second communication peer end, the address of the proxy routing entity, an address of the second mobile node, and the tunnel information of the first tunnel; and forwarding, by the first mobility router the second data packet by using the first tunnel, wherein the second data packet comprises the address of the second communication peer end, the address of the first mobility router, and the address of the second mobile node, so that a binding relationship among the address of the second communication peer end, the address of the first mobility router, the address of the second mobile node, and the tunnel information of the first tunnel is established in the proxy routing entity.

10. A mobility router, comprising, a receiver configured to receive a first data packet sent by a first mobile node to a first communication peer end, wherein the mobility router is a mobility router in a visited network of the first mobile node, and the first data packet comprises an address of the first communication peer end;

a processor configured to acquire an address of a proxy routing entity based on the address of the first communication peer end, wherein the proxy routing entity is located in a communication path between the mobility router and the first communication peer end, establish a second tunnel to a second mobility router, wherein the second mobility router is a mobility router in a home network of the first mobile node, and establish a first tunnel to the proxy routing entity based on the address of the proxy routing entity; and a transmitter configured to: before establishment of the first tunnel is completed, transmit the first data packet between the first mobile node and the first communication peer end by using the second tunnel, and transmit, by using the first tunnel, a subsequent data packet that follows the first data packet and is sent by the first communication peer end to the first mobile node.

11. The mobility router according to claim 10, wherein:

the processor is further configured to tear down the first tunnel and the second tunnel when determining that the first mobile node communicates with the first communication peer end by using a third tunnel between a third mobility router and the proxy routing entity and a fourth tunnel between the third mobility router and the second mobility router.

12. The mobility router according to claim 10, wherein the processor receives a route optimization command sent by the second mobility router, wherein the route optimization command comprises the address of the proxy routing entity and is used to instruct the mobility router to establish the first tunnel to the proxy routing entity; and acquires the address of the proxy routing entity from the route optimization command.

13. The mobility router according to claim 10, wherein:

the processor is further configured to: cache the first data packet before establishment of the first tunnel is completed; and/or forward, by using the first tunnel, the cached first data packet to the first communication peer end after establishment of the first tunnel is completed.

14. The mobility router according to claim 10, wherein the processor acquires the address of the proxy routing entity from a server based on the address of the first communication peer end, wherein a binding relationship between the address of the proxy routing entity and the address of the first communication peer end is set on the server.

15. The mobility router according to claim 14, wherein the processor sends a request message that comprises the address of the first communication peer end to a location management entity or a centralized server, and receives a response message that comprises the address of the proxy routing entity and is returned by the location management entity or the centralized server.

16. The mobility router according to claim 14, wherein the processor sends a request message that comprises the address of the first communication peer end to a domain name server, to acquire the address of the proxy routing entity; receives a response message that comprises a domain name corresponding to the address of the first communication peer end and is returned by the domain name server; sends a request message that comprises the domain name corresponding to the address of the first communication peer end to the domain name server; and receives a response message that comprises the address of the proxy routing entity and is returned by the domain name server.

17. The mobility router according to claim 10, wherein the processor establishes a binding relationship among the address of the first communication peer end, the address of the proxy routing entity, an address of the first mobile node, and tunnel information of the first tunnel; and sends a tunnel establishment request message to the proxy routing entity, wherein the tunnel establishment request message comprises an address of the mobility router, the address of the first communication peer end, and the address of the first mobile node, so that a binding relationship among the address of the mobility router, the address of the first communication peer end, the address of the first mobile node, and the tunnel information of the first tunnel is established in the proxy routing entity.

18. The mobility router according to claim 17, wherein the receiver further receives a second data packet sent by a second mobile node to a second communication peer end, wherein the second data packet comprises an address of the second communication peer end;

the processor further acquires the address of the proxy routing entity based on the address of the second communication peer end;

in a case in which the establishing module determines, according to the address of the proxy routing entity, that the first tunnel is established, the processor further establishes a binding relationship among the address of the second communication peer end, the address of the proxy routing entity, an address of the second mobile node, and the tunnel information of the first tunnel; and the transmitter further forwards the second data packet by using the first tunnel, wherein the second data packet comprises the address of the second communication peer end, the address of the mobility router, and the address of the second mobile node, so that a binding relationship among the address of the second communication peer end, the address of the mobility router, the address of the second mobile node, and the tunnel information of the first tunnel is established in the proxy routing entity.

* * * * *

UNITED STATES PATENT AND TRADEMARK OFFICE
CERTIFICATE OF CORRECTION

PATENT NO. : 10,142,859 B2
APPLICATION NO. : 15/201877
DATED : November 27, 2018
INVENTOR(S) : Ning He et al.

Page 1 of 1

It is certified that error appears in the above-identified patent and that said Letters Patent is hereby corrected as shown below:

In the Claims

Column 43, Line 61:
In Claim 10, delete "comprising,", and insert -- comprising: --, therefor.

Signed and Sealed this
Tenth Day of September, 2019

Andrei Iancu
*Director of the United States Patent and Trademark Office*